(12) United States Patent
Yaginuma et al.

(10) Patent No.: US 11,456,477 B2
(45) Date of Patent: Sep. 27, 2022

(54) FUEL CELL STACK

(71) Applicant: NISSAN MOTOR CO., LTD., Yokohama (JP)

(72) Inventors: Motoki Yaginuma, Kanagawa (JP); Manabu Sugino, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 90 days.

(21) Appl. No.: 16/767,674

(22) PCT Filed: Nov. 29, 2017

(86) PCT No.: PCT/JP2017/042881
§ 371 (c)(1),
(2) Date: May 28, 2020

(87) PCT Pub. No.: WO2019/106765
PCT Pub. Date: Jun. 6, 2019

(65) Prior Publication Data
US 2021/0367259 A1    Nov. 25, 2021

(51) Int. Cl.
| | |
|---|---|
| *H01M 8/2432* | (2016.01) |
| *H01M 8/0206* | (2016.01) |
| *H01M 8/0228* | (2016.01) |
| *H01M 8/0247* | (2016.01) |
| *H01M 8/0267* | (2016.01) |
| *H01M 8/248* | (2016.01) |

(52) U.S. Cl.
CPC ....... *H01M 8/2432* (2016.02); *H01M 8/0206* (2013.01); *H01M 8/0228* (2013.01); *H01M 8/0247* (2013.01); *H01M 8/0267* (2013.01); *H01M 8/248* (2013.01)

(58) Field of Classification Search
None
See application file for complete search history.

(56) References Cited

U.S. PATENT DOCUMENTS

| | | | |
|---|---|---|---|
| 8,383,284 B2 | 2/2013 | Selcuk et al. | |
| 2015/0037706 A1* | 2/2015 | Fukuyama | H01M 8/0267 |
| | | | 429/468 |

(Continued)

FOREIGN PATENT DOCUMENTS

| | | |
|---|---|---|
| DE | 10317388 A1 | 11/2004 |
| JP | 2007-35321 A | 2/2007 |

(Continued)

*Primary Examiner* — Alix E Eggerding
(74) *Attorney, Agent, or Firm* — Foley & Lardner LLP

(57) ABSTRACT

A fuel cell stack including: a metal-supported cell including a power generation cell formed of paired electrodes and an electrolyte sandwiched from both sides between the paired electrodes, and a metal supporting portion which is made of metal and which supports the power generation cell; a separator defining and forming a flow passage portion for gas flow between the separator and the power generation cell; a welded portion in which the metal-supported cell and the separator are welded to each other; a spring portion configured to apply absorption reaction force for absorbing displacement in a stacking direction in the welded portion to the metal-supported cell; and a stopper portion configured to restrict a displacement amount of the spring portion.

6 Claims, 16 Drawing Sheets

(56) References Cited

U.S. PATENT DOCUMENTS

2016/0164110 A1\* 6/2016 Horai ................ H01M 8/0267
  429/482
2020/0235417 A1\* 7/2020 Yaginuma ........... H01M 8/0202

FOREIGN PATENT DOCUMENTS

| JP | 4331790 B2 | | 9/2009 |
|---|---|---|---|
| JP | 2009-242922 A | | 10/2009 |
| JP | 2012-129108 | \* | 5/2012 |

\* cited by examiner

FUEL CELL STACK

TECHNICAL FIELD

The present invention relates to a fuel cell stack.

BACKGROUND ART

A fuel cell stack is formed by stacking multiple cell units which each include a power generation cell configured to generate power by using supplied gas and a separator defining and forming a flow passage portion for gas flow between the separator itself and the power generation cell. The contact resistance between the stacked components needs to be reduced to improve the power generation performance of the fuel cell stack.

For example, Patent Literature 1 listed below discloses a fuel cell stack having a structure in which a current collection assisting layer is buried between electrodes of each power generation cell to reduce the contact resistance between the current collection assisting layer and the power generation cell. Moreover, Patent Literature 2 listed below discloses a fuel cell stack in which a current collection member is extended to the outside of an active area to obtain electrical connection between components outside the active area.

CITATION LIST

Patent Literature

Patent Literature 1: Japanese Patent Application Publication No. 2007-35321
Patent Literature 2: Japanese Patent No. 4331790

SUMMARY OF INVENTION

Technical Problem

Since the flow passage portion of the separator has a shape of protrusions and recesses, height variation is likely to occur. Particularly, in some metal-supported cell type solid oxide fuel cells (SOFC), the separator is welded to a metal-supported cell. In welded portions, height of the separator is likely to vary depending on welding quality. When there is variation in the height of the flow passage portion of the separator, the contact resistance of the fuel cell stack increases and the power generation performance decreases in some case.

In the fuel cell stacks of the aforementioned Patent Literatures 1 and 2, the variation in the height of the separator is not considered. Accordingly, there is a possibility that the contact resistance increases and the power generation performance decreases.

An object of the present invention is to provide a fuel cell stack which can reduce the contact resistance and improve the power generation performance.

Solution to Problem

A fuel cell stack of the present invention for achieving the aforementioned object includes: a metal-supported cell; a separator; and a welded portion in which the metal-supported cell and the separator are welded to each other. The fuel cell stack further includes: a spring portion configured to apply absorption reaction force for absorbing displacement in a stacking direction in the welded portion to the metal-supported cell; and a stopper portion configured to restrict a displacement amount of the spring portion.

DESCRIPTION OF EMBODIMENTS

Figure 1:
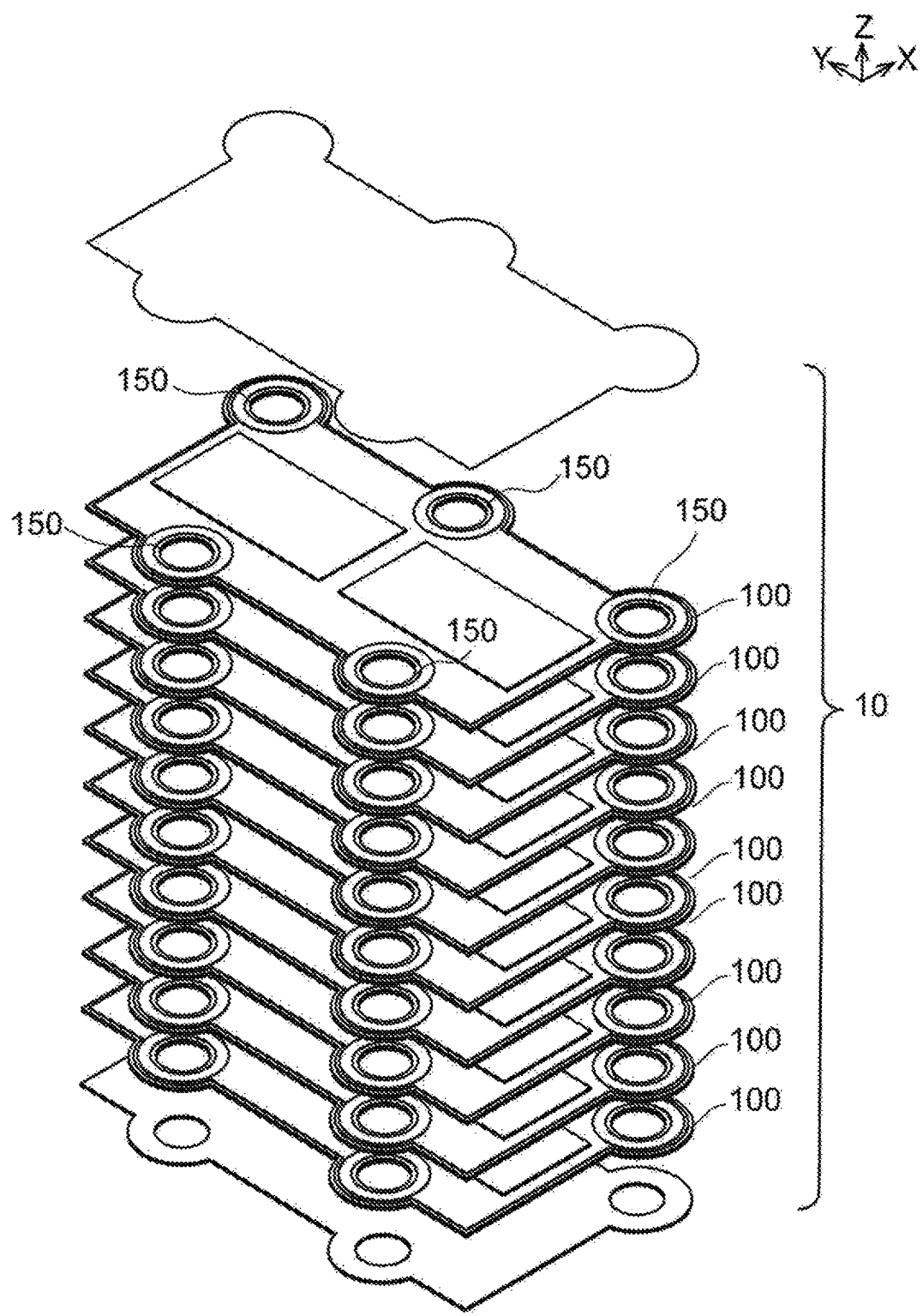
FIG. 1 is an exploded perspective view illustrating a fuel cell stack according to a first embodiment.

Embodiments of the present invention are described below with reference to the attached drawings. Note that the following description does not limit the technical scope and the definition of the terms described in the claims. Moreover, the dimensional proportions in the drawings may be exaggerated for the sake of description and be different from the actual proportions.

First Embodiment

A fuel cell stack 10 of a first embodiment is described with reference to FIGS. 1 to 5B. The fuel cell stack 10 of the embodiment is used in, for example, a solid oxide fuel cell (SOFC) which uses an oxide ion conductor such as, for example, stabilized zirconia as an electrolyte.

An XYZ orthogonal coordinate system is illustrated in the drawings for the sake of the following description. An X axis and a Y axis are axes parallel to the horizontal direction and a Z axis is an axis parallel to the up-down direction.

FIG. 1 is an exploded perspective view illustrating the fuel cell stack according to the first embodiment. As illustrated in FIG. 1, the fuel cell stack 10 is formed by stacking multiple cell units 100 in the up-down direction. The up-down direction of the fuel cell stack 10 represented by the Z-axis in the drawings are also referred to as "stacking direction" hereafter.

(Cell Unit 100)

Figure 2:
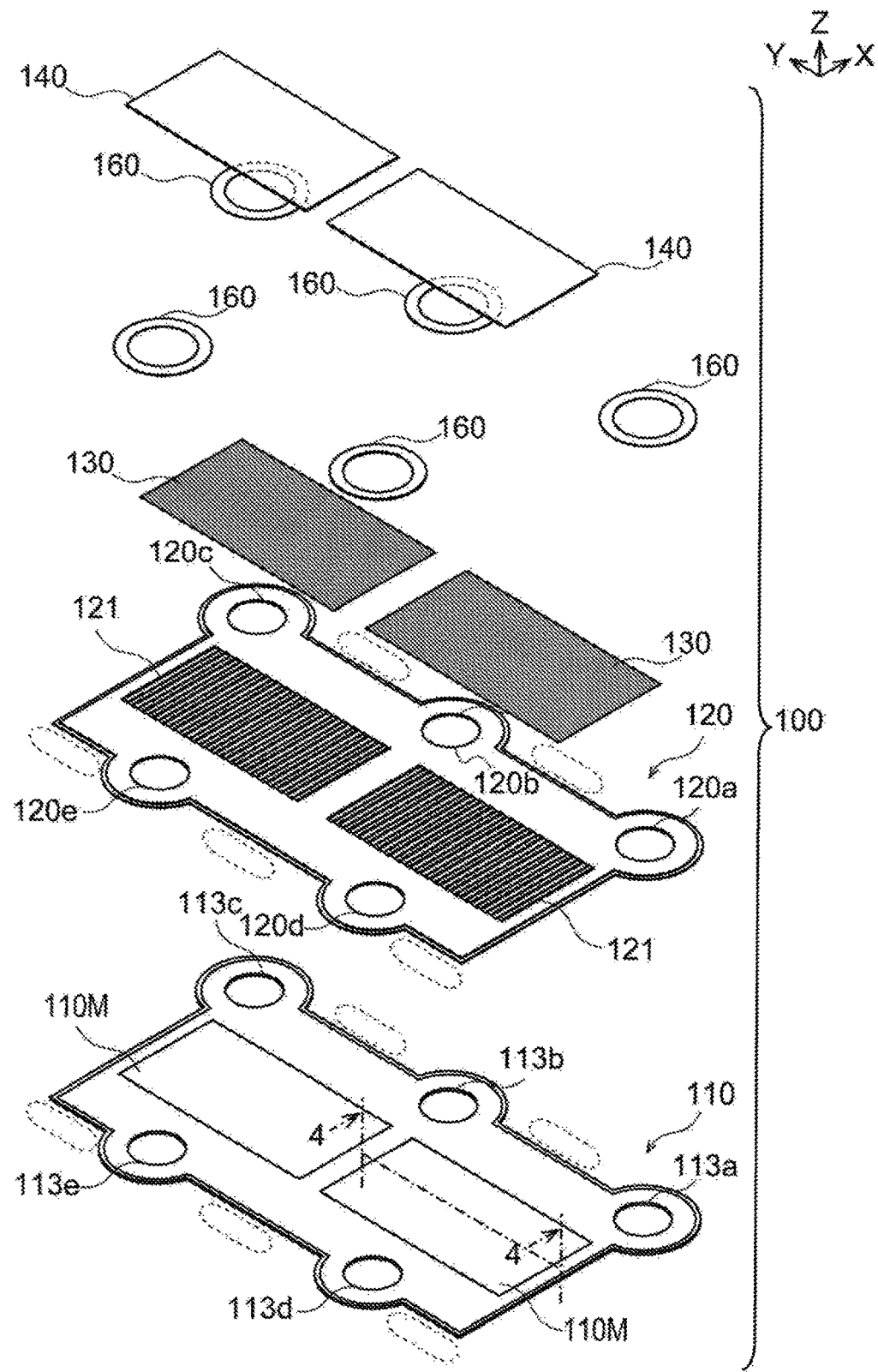
FIG. 2 is an exploded perspective view of a cell unit illustrated in FIG. 1.

FIG. 2 is an exploded perspective view of the cell unit 100. As illustrated in FIG. 2, each cell unit 100 is formed by stacking a metal-supported cell assembly 110, a separator 120 which defines and forms flow passage portions 121 for gas flow between itself and power generation cells 111, height adjusters 130, and current collection assisting layers 140 in this order.

The cell unit 100 further includes manifold portions 150 (see FIG. 1) for supplying and discharging an anode gas by allowing the anode gas to flow and multiple sealing portions 160 (see FIG. 2) which seal peripheries of the manifold portions 150 and limit flow of gas. Note that, in the embodiment, the fuel cell stack 10 is configured to have an open cathode structure in which a cathode gas freely flows outside the cell unit 100 (portions surrounded by broken lines in FIGS. 2 and 3).

Figure 3:
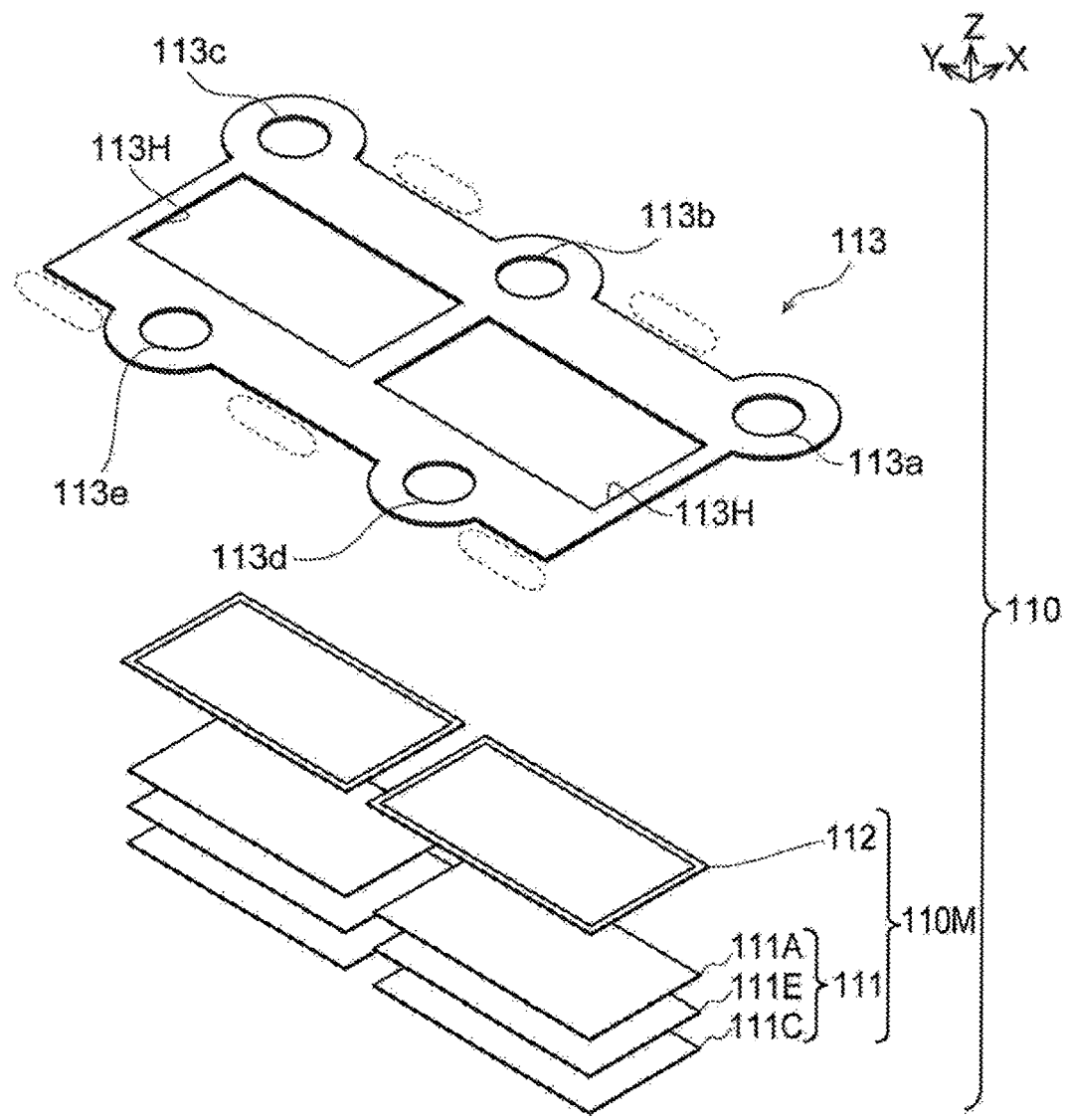
FIG. 3 is an exploded perspective view of a metal-supported cell assembly illustrated in FIG. 2.
Figure 4:
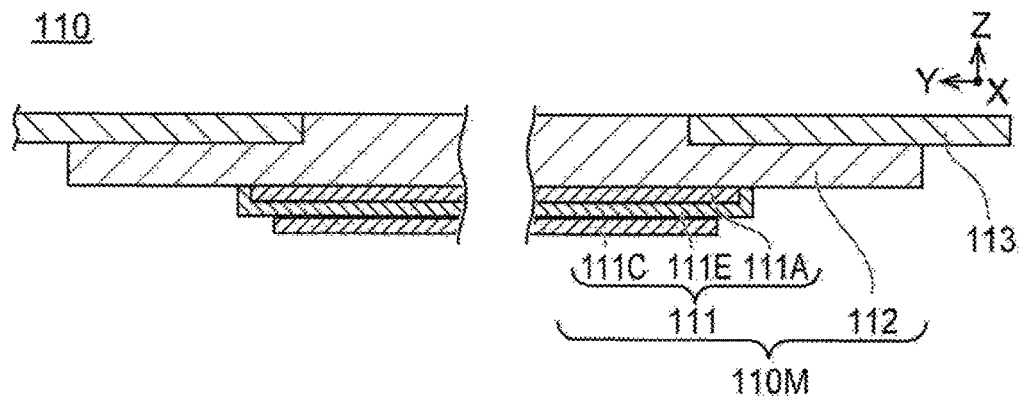
FIG. 4 is a partial cross-sectional view of the metal-supported cell assembly taken along the line 4-4 in FIG. 2.

FIG. 3 is an exploded perspective view of the metal-supported cell assembly 110 and FIG. 4 is a partial cross-sectional view of the metal-supported cell assembly 110. As illustrated in FIGS. 3 and 4, the metal-supported cell assembly 110 includes multiple (two in the embodiment) metal-supported cells (MSC) 110M arranged side by side in a long-side direction Y and a cell frame 113 holding outer peripheries of the metal-supported cells 110M.

Each metal-supported cell 110M includes: a power generation cell 111 formed by sandwiching an electrolyte 111E from both sides between an anode 111A and a cathode 111C which are paired electrodes; and a metal supporting portion 112 made of metal and supporting the power generation cell 111 from one side in the up-down direction. The metal-supported cell 110M has better mechanical strength, rapid start-up performance, and the like than an electrolyte supported cell and an electrode supported cell.

Figure 5A:
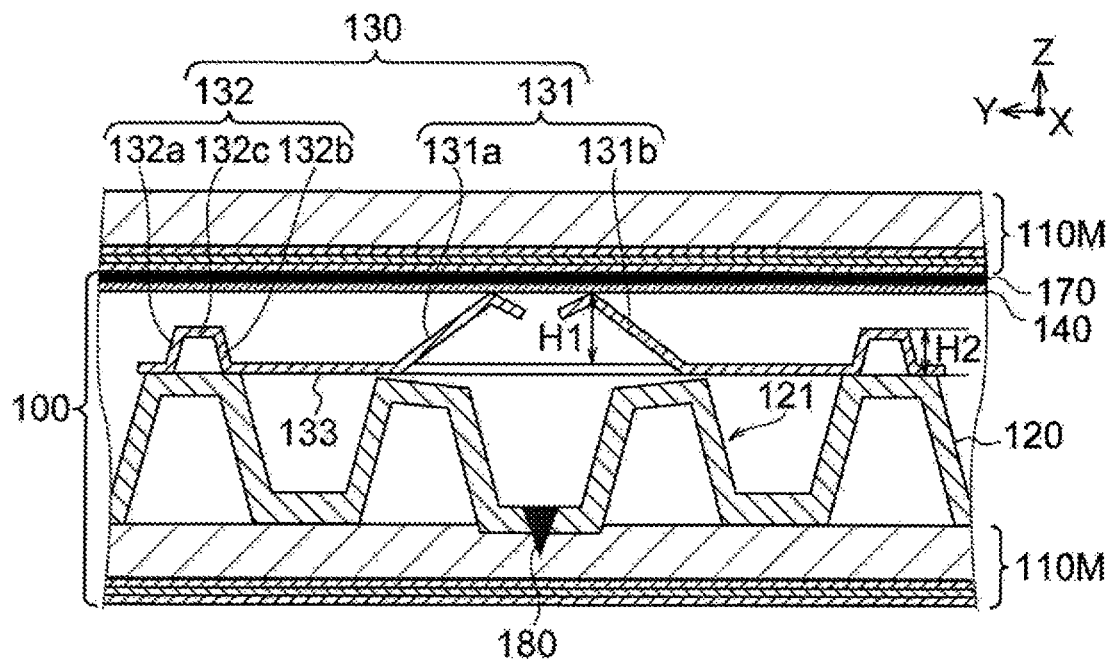
FIG. 5A is a cross-sectional view of the fuel cell stack according to the first embodiment.

FIG. 5A is a cross-sectional view illustrating a portion of a stacked structure of the fuel cell stack 10. As illustrated in FIG. 5A, the fuel cell stack 10 further includes contact members 170 which are each arranged between a corresponding one of the metal-supported cells 110M and a corresponding one of the current collection assisting layers 140 and welded portions 180 in each of which a corresponding one of the metal-supported cells 110M and a corresponding one of the separators 120 are welded to each other.

A configuration of the height adjusters 130 are described below in detail. Note that other components of the cell unit 100 are described in detail later.

(Height Adjuster 130)

As illustrated in FIG. 5A, each height adjuster 130 includes a spring portion 131 which applies absorption reaction force for absorbing height displacement in the stacking direction in the welded portion 180 to the metal-supported cell 110M via the current collection assisting layers 140 and the contact member 170 and stopper portions 132 which restricts a displacement amount of the spring portion 131.

Figure 5B:
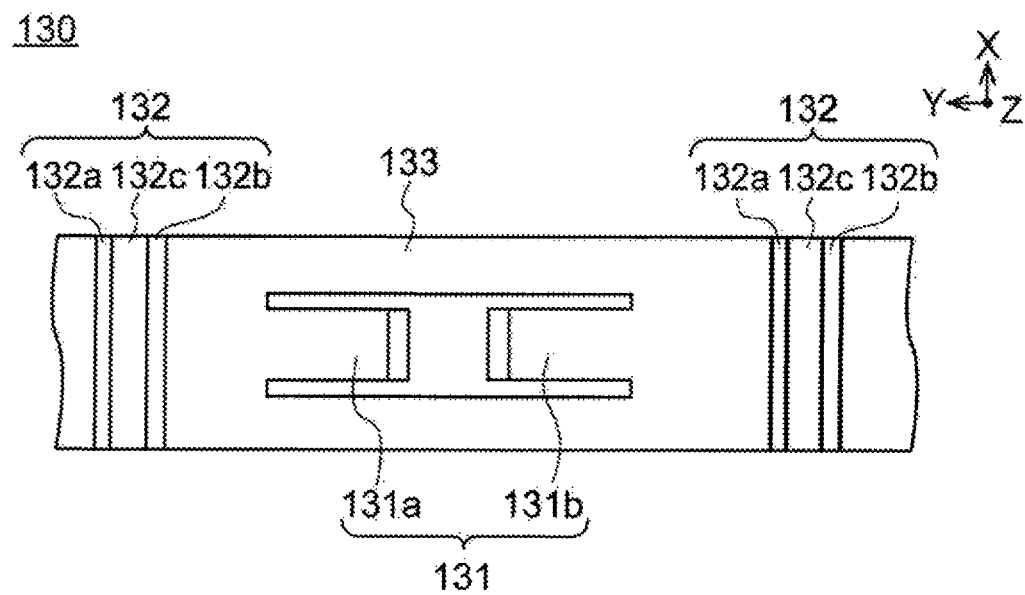
FIG. 5B is a plan view of a spring portion and stopper portions according to the first embodiment.

FIG. 5B is a plan view of the spring portion 131 and the stopper portions 132. As illustrated in FIG. 5B, in the embodiment, the spring portion 131 and the stopper portions 132 are integral with each other by sharing one flat base plate 133. Configuring the spring portion 131 and the stopper portions 132 such that they are integral with each other can reduce manufacturing cost and material cost. Moreover, this can reduce effects of variation (tolerance) in the height of the spring portion 131 and the stopper portions 132.

Note that "the spring portion and the stopper portions are integral with each other" in this description means that the spring portion and the stopper portions are configured as an integral part and widely includes a mode in which different portions of the integral part exhibit the function of the spring portion and the function of the stopper portions, respectively. For example, the spring portion 131 and the stopper portions 132 may share one base plate 133 as in the embodiment to form the integral part. Alternatively, a spring portion and stopper portions formed of separate members may be directly joined to one another or be indirectly joined to one another via other members to form the integral part.

As illustrated in FIGS. 5A and 5B, the spring portion 131 includes a first standing piece (corresponding to elastic member) 131a and a second standing piece (corresponding to elastic member) 131b which are formed by cutting portions of the base plate 133 and causing these portions to stand upward. The first standing piece 131a and the second standing piece 131b are arranged on both sides of the welded portion 180. The first standing piece 131a and the second standing piece 131b are elastically-deformable cantilevers. The first standing piece 131a and the second standing piece 131b are arranged to stand in such directions that the first standing piece 131a and the second standing piece 131b extend toward each other in the long-side direction Y. Note that the shape and spring characteristics (for example, spring constant and spring stroke) of the spring portion 131 can be appropriately selected depending on, for example, the arrangement and number of the welded portions 180, the structure of the fuel cell stack 10, and the like.

Each stopper portion 132 has a bridge shape including a first bent portion 132a and a second bent portion 132b which are formed by bending portions of the base plate 133 such that these portions stand upward and a flat portion 132c which connects the first bent portion 132a and the second bent portion 132b. The stopper portion 132 has a both-end-supported structure in which end portions of the first bent portion 132a and the second bent portion 132b are fixed to the base plate 133.

In the embodiment, as illustrated in FIG. 5A, the spring portion 131 is arranged closer to the welded portion 180 than the stopper portions 132 are. Moreover, the height H1 of the spring portion 131 (length in the stacking direction) before stacking and compression is greater than the height H2 of the stopper portions 132. The spring portion 131 can thereby contract by an amount corresponding to a height difference (step height) between the spring portion 131 and the stopper portions 132. The height displacement in the stacking direction in the welded portion 180 can be absorbed by the contraction amount of the spring portion 131.

Figure 6:
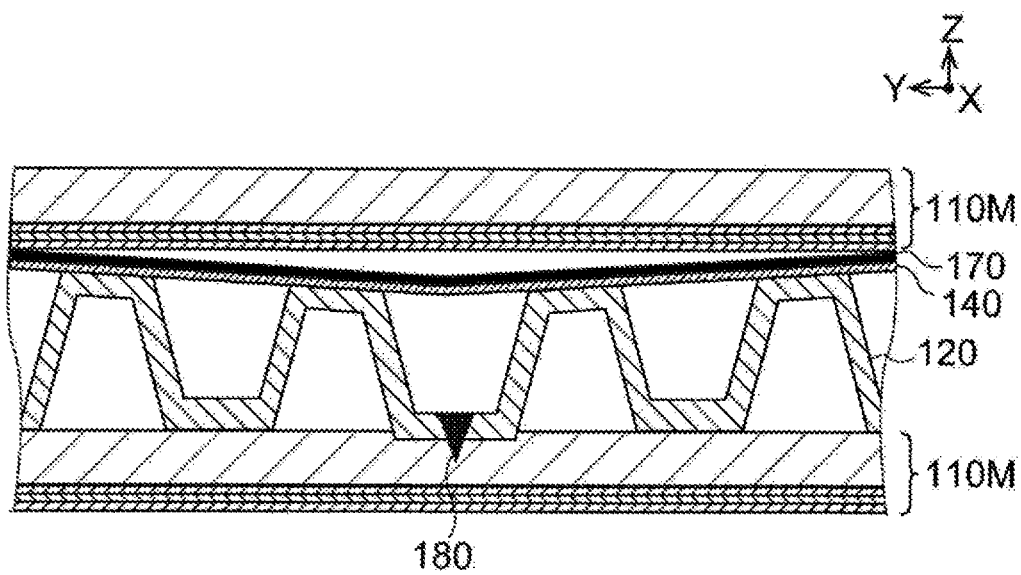
FIG. 6 is a cross-sectional view of a fuel cell stack according to Comparative Example 1.

Operations and effects of the fuel cell stack 10 according to the embodiment are described with reference to FIGS. 6 to 8 by comparing the fuel cell stack 10 to fuel cell stacks according to comparative examples. FIG. 6 is a cross-sectional view of a fuel cell stack according to Comparative Example 1, FIG. 7 is a cross-sectional view of a fuel cell stack according to Comparative Example 2, and FIG. 8 is a cross-sectional view of a fuel cell stack according to Comparative Example 3.

Generally, in each welded portion 180 of the metal-supported cell 110M and the separator 120, the height variation sometimes occurs due to welding quality. For example, as in the fuel cell stack according to Comparative Example 1 illustrated in FIG. 6, when a portion near the welded portion 180 thermally contracts due to welding heat, the portion near the welded portion 180 becomes lower than a surrounding portion. A gap is thereby formed between the metal-supported cell 110M and the contact member 170 stacked above the welded portion 180 and the contact resistance increases.

Figure 7:
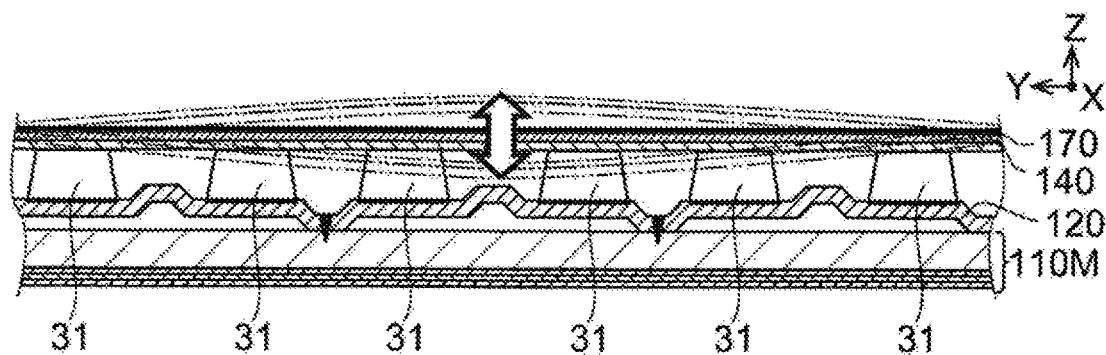
FIG. 7 is a cross-sectional view of a fuel cell stack according to Comparative Example 2.

For example, in the fuel cell stack according to Comparative Example 2 illustrated in FIG. 7, spring portions 31 configured to absorb the displacement in the stacking direction alone are arranged between the separator 120 and the current collection assisting layer 140 to suppress height variation in an active area. However, in the fuel cell stack according to Comparative Example 2, when vibration is inputted as illustrated by the arrow of FIG. 7, the spring portions 31 vibrate and cannot support the metal-supported cell 110M. Accordingly, vibration resistance decreases.

Figure 8:
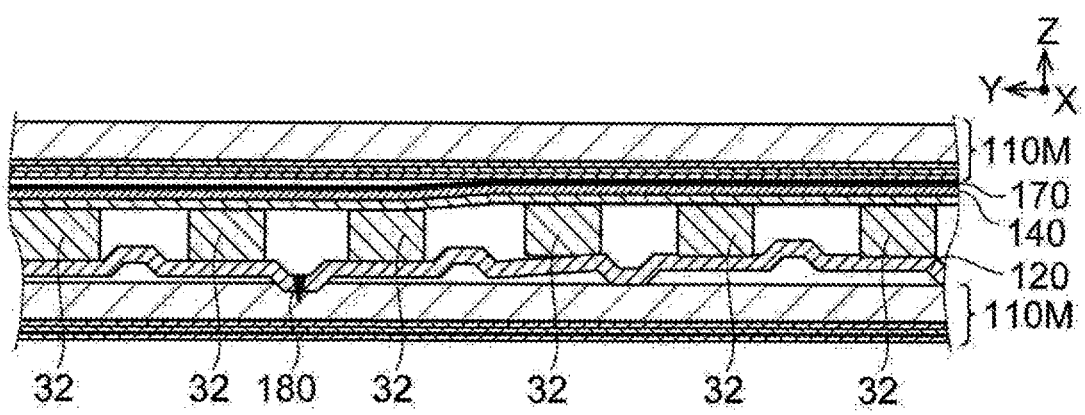
FIG. 8 is a cross-sectional view of a fuel cell stack according to Comparative Example 3.

Moreover, for example, in the fuel cell stack according to Comparative Example 3 illustrated in FIG. 8, ribs 32 having high stiffness and configured to the support the metal-supported cell 110M alone are arranged between the separator 120 and the current collection assisting layer 140 to improve the vibration resistance by increasing the stiffness of the active area in the stacking direction. However, when there is height variation in the welded portion 180 as described above, a gap is formed between the metal-supported cell 110M and the contact member 170 and the contact resistance increases.

Meanwhile, in the embodiment, as illustrated in FIG. 5A, both of the spring portion 131 and the stopper portions 132 are provided between the separator 120 and the current collection assisting layer 140. The spring portion 131 contracts in the stacking and applies the absorption reaction force to the metal-supported cell 110M via the current collection assisting layer 140 and the contact member 170. The absorption reaction force presses the current collection assisting layer 140 and the contact member 170 toward the metal-supported cell 110M. This can reduce the gap formed between the metal-supported cell 110M and the contact member 170 and reduce the contact resistance.

Moreover, the stopper portions 132 limit the displacement amount by which the spring portion 131 contracts in the stacking. The metal-supported cell 110M and the contact member 170 can be thereby evenly brought into contact with each other. Moreover, the stopper portions 132 suppress vibration of the spring portion 131 and can thus improve the vibration resistance.

Furthermore, in the embodiment, the spring portion 131 is arranged closer to the welded portion 180 than the stopper portions 132 are. When the portion near the welded portion 180 becomes lower than the surrounding portion due to thermal contraction (see FIG. 6), the difference in height between the portion near the welded portion 180 and the surrounding portion can be compensated by arranging the spring portion 131 in the relatively-low welded portion 180. As a result, the height variation in the welded portion 180 can be more surely suppressed.

Configurations of the cell unit 100 other than the height adjusters 130 are described below in detail.
(Power Generation Cell 111)

As illustrated in FIGS. 3 and 4, each power generation cell 111 is configured by sandwiching the electrolyte 111E from both sides between the anode 111A and the cathode 111C which are the paired electrodes.

The electrolyte 111E allows oxide ions to pass through from the cathode 111C to the anode 111A. The electrolyte 111E allows oxide ions to pass through but does not allow gas and electrons to pass through. For example, solid oxide ceramic such as stabilized zirconia containing yttrium, neodymium oxide, samarium, gadolinium, scandium, or the like in a solid solution state can be given as an example of the material forming the electrolyte 111E.

The anode 111A is a fuel electrode and causes the anode gas (for example, hydrogen) to react with oxide ions to generate oxide of the anode gas and take out electrons. The anode 111A is resistant to a reducing atmosphere, allows the anode gas to pass through, has high electrical conductivity, and has a catalyst effect of causing the anode gas to react with oxide ions. For example, cemented carbide in which metal such as nickel and oxide ion conductor such as yttria-stabilized zirconia are mixed can be given as an example of the material forming the anode 111A.

The cathode 111C is an oxidant electrode and causes the cathode gas (for example, oxygen included in air) to react with electrons to convert oxygen molecules into oxide ions. The cathode 111C is resistant to an oxidizing atmosphere, allows the cathode gas to pass through, has high electrical conductivity, and has a catalyst effect of converting oxygen molecules into oxide ions. For example, an oxide of lanthanum, strontium, manganese, cobalt, or the like can be given as an example of the material forming the cathode 111C.
(Metal Supporting Portion 112)

As illustrated in FIGS. 3 and 4, each metal supporting portion 112 supports the power generation cell 111 from the anode 111A side. The metal supporting portion 112 is a porous metal having gas permeability and electrical conductivity. For example, stainless steel or corrosion resistant alloy or corrosion resistant steel containing nickel and chrome can be given as an example of the material forming the metal supporting portion 112.
(Cell Frame 113)

As illustrated in FIGS. 3 and 4, the cell frame 113 holds the peripheries of the metal-supported cells 110M. The cell frame 113 includes multiple (two in the embodiment) opening portions 113H arranged side by side in the long-side direction Y. The metal-supported cells 110M are arranged in the opening portions 113H of the cell frame 113. The outer peripheries of the metal-supported cells 110M are joined to inner edges of the opening portions 113H of the cell frame 113. For example, metal with a surface subjected to insulation treatment can be given as an example of the material forming the cell frame 113.

As illustrated in FIG. 3, the cell frame 113 has an anode gas first flow-in port 113a, an anode gas second flow-in port 113b, an anode gas third flow-in port 113c, an anode gas first flow-out port 113d, and an anode gas second flow-out port 113e through which the anode gas flows.

(Separator 120)

As illustrated in FIG. 5A, the separator 120 is arranged between the metal-supported cells 110M adjacent to each other in the stacking direction Z. The separator 120 has flow passage portions 121 in regions facing the power generation cells 111 of the metal-supported cells 110M. Each flow passage portion 121 has a shape of protrusions and recesses which forms and defines flow passages of gas between themselves and the power generation cell 111. For example, a metal can be given as an example of the material forming the separator 120. Regions of the separator 120 other than the flow passage portions 121 are subjected to insulating treatment.

The flow passage portions 121 of the separator 120 are formed in a substantially linear shape such that the shape of protrusions and recesses extends in the short-side direction X. The flow direction of the gas flowing along the flow passage portions 121 is thus the short-side direction X.

As illustrated in FIG. 2, the separator 120 has an anode gas first flow-in port 120a, an anode gas second flow-in port 120b, an anode gas third flow-in port 120c, an anode gas first flow-out port 120d, and an anode gas second flow-out port 120e through which the anode gas flows.

(Current Collection Assisting Layer 140)

As illustrated in FIG. 5A, each current collection assisting layer 140 is arranged between the metal-supported cell 110M and the separator 120. The current collection assisting layer 140 makes the surface pressure even while forming a space through which the gas flows, and assists an electrical contact between the metal-supported cell 110M and the separator 120. The current collection assisting layer 140 is expanded metal with a metal mesh shape.

(Manifold Portions 150)

The manifold portions 150 illustrated in FIG. 1 are formed of the anode gas flow-in and flow-out ports 113a, 113b, 113c, 113d, 113e of the cell frame 113 and the anode gas flow-in and flow-out ports 120a, 120b, 120c, 120d, 120e of the separator 120 illustrated in FIG. 2.

(Sealing Portion 160)

The sealing portions 160 are made of a material with heat resistance and sealing properties. For example, Thermiculite (registered trademark) whose main raw material is vermiculite can be given as an example of such a material.

(Contact Member 170)

As illustrated in FIG. 5A, the contact member 170 is arranged between the metal-supported cell 110M and the current collection assisting layer 140 and brings these components into conductive contact with each other. Although the material forming the contact member 170 is not limited to a particular material, a material whose main component is a transition metal with a melting point of 600° C. or more, specifically, a material whose main component is silver can be given as an example of the material forming the contact member 170.

Operations and effects of the fuel cell stack 10 according to the aforementioned embodiment are described.

As described above, the fuel cell stack 10 according to the embodiment includes: the metal-supported cells 110M each including the power generation cell 111 which is formed by sandwiching the electrolyte 111E from both sides between the paired electrodes 111A, 111C and the metal supporting portion 112 which is made of metal and which supports the power generation cell 111; the separators 120 defining and forming the flow passages for gas between itself and the power generation cells 111; the welded portions 180 in which the metal-supported cells 110M and the separators 120 are welded to one another; the spring portions 131 configured to apply the absorption reaction force for absorbing the height displacement in the stacking direction in the welded portions 180 to the metal-supported cells 110M; and the stopper portions 132 configured to restricts a displacement amount of the spring portions 131.

According to the aforementioned fuel cell stack 10, the spring portions 131 can suppress contact failures between the metal-supported cells 110M and the other components (for example, the contact members 170) which may occur due to the height variation in the welded portions 180, by applying the absorption reaction force to the metal-supported cells 110M. Moreover, the stopper portions 132 can cause the metal-supported cells 110M and the other components (for example, the contact members 170) to evenly come into contact with one another by limiting the displacement amount of the spring portions 131. As a result, the contact resistance is reduced by eliminating the height variation in the welded portions 180 and this can improve the power generation performance of the fuel cell stack 10.

Moreover, each spring portion 131 includes the first standing piece 131a and the second standing piece 131b (corresponding to the plurality of elastic members) on the same plane (XY plane). The first standing piece 131a and the second standing piece 131b are arranged on the both sides of the welded portion 180. Arranging portions of the spring portion 131 on the both sides of the welded portion 180 where the height variation is likely to occur can eliminate the height variation in the welded portion 180 and more surely reduce the contact resistance.

Furthermore, the spring portion 131 and the stopper portions 132 are integral with each other. This can reduce the manufacturing cost and the material cost. In addition, the effect of the variation (tolerance) in the height of the spring portion 131 and the stopper portions 132 can be reduced.

Moreover, the height H1 of the spring portion 131 before compression is greater than the height H2 of the stopper portions 132. The spring portion 131 can thereby contract by an amount corresponding to the height difference between the spring portion 131 and the stopper portions 132. The height displacement in the stacking direction in the welded portion 180 can be absorbed by the contraction amount of the spring portion 131.

Modified examples of the first embodiment are described below. Note that the same configurations as those in the aforementioned first embodiment are denoted by the same reference numerals and description thereof is omitted.

Modified Example 1 of First Embodiment

Figure 9:
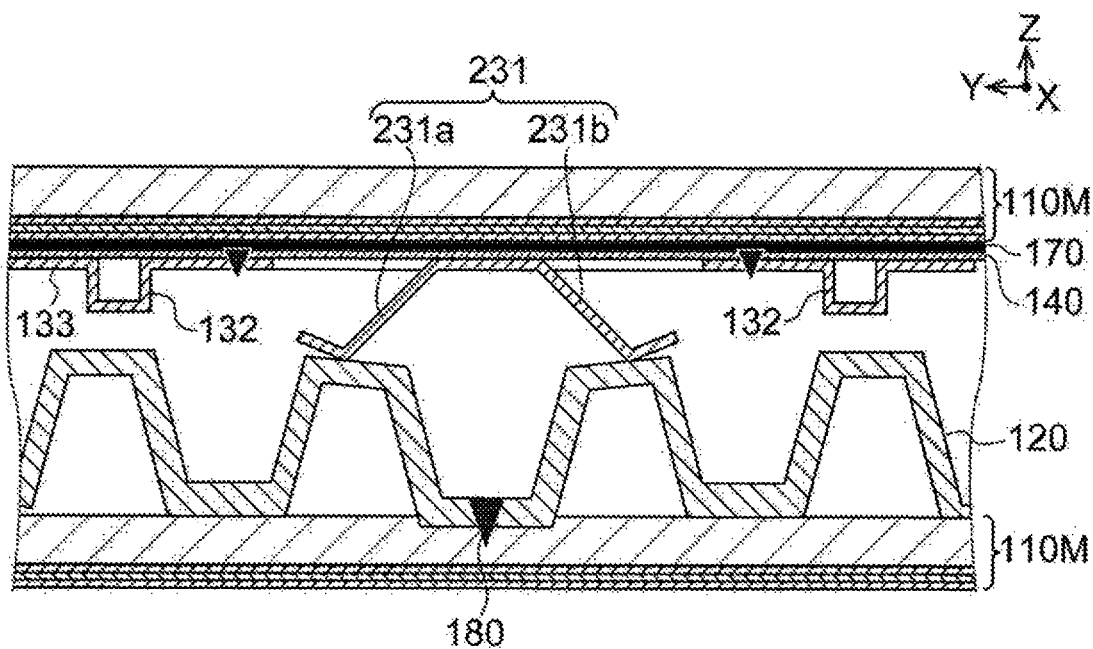
FIG. 9 is a cross-sectional view of a fuel cell stack according to Modified Example 1 of the first embodiment.

FIG. 9 is a cross-sectional view of a fuel cell stack according to Modified Example 1 of the first embodiment. As illustrated in FIG. 9, the fuel cell stack according to Modified Example 1 of the first embodiment is different from the aforementioned first embodiment in that the base plate 133 of a spring portion 231 and the stopper portions 132 is welded to the current collection assisting layer 140.

In the aforementioned first embodiment, the spring portion 231 and the stopper portions 132 are arranged on the current collection assisting layer 140 side of (above) the base plate 133. However, in this modified example, the spring portion 231 and the stopper portions 132 are arranged on the separator 120 side of (below) the base plate 133. Since the base plate 133 is arranged on the current collection assisting layer 140 side, the base plate 133 and the current collection assisting layer 140 can be easily welded to each other.

Moreover, a first standing piece 231a and a second standing piece 231b of the spring portion 231 are arranged to stand in such directions that the first standing piece 231a and the second standing piece 231b extend away from each other in the long-side direction Y. The first standing piece 231a and the second standing piece 231b are thereby arranged to surely come into contact with the protrusion portions of the flow passage portion 121 of the separator 120 around the welded portion 180.

The current collection assisting layer 140, the spring portion 231, and the stopper portions 132 are integral with each other by welding the base plate 133 and the current collection assisting layer 140 to each other. Integrating the current collection assisting layer 140, the spring portion 231, and the stopper portions 132 can reduce the number of parts in assembly of the fuel cell stack 10. This can reduce the man-hour and reduce the manufacturing cost. Moreover, it is possible to reduce effects of variation (tolerance) in the height of the current collection assisting layer 140, the spring portion 231, and the stopper portions 132.

Modified Example 2 of First Embodiment

Figure 10:
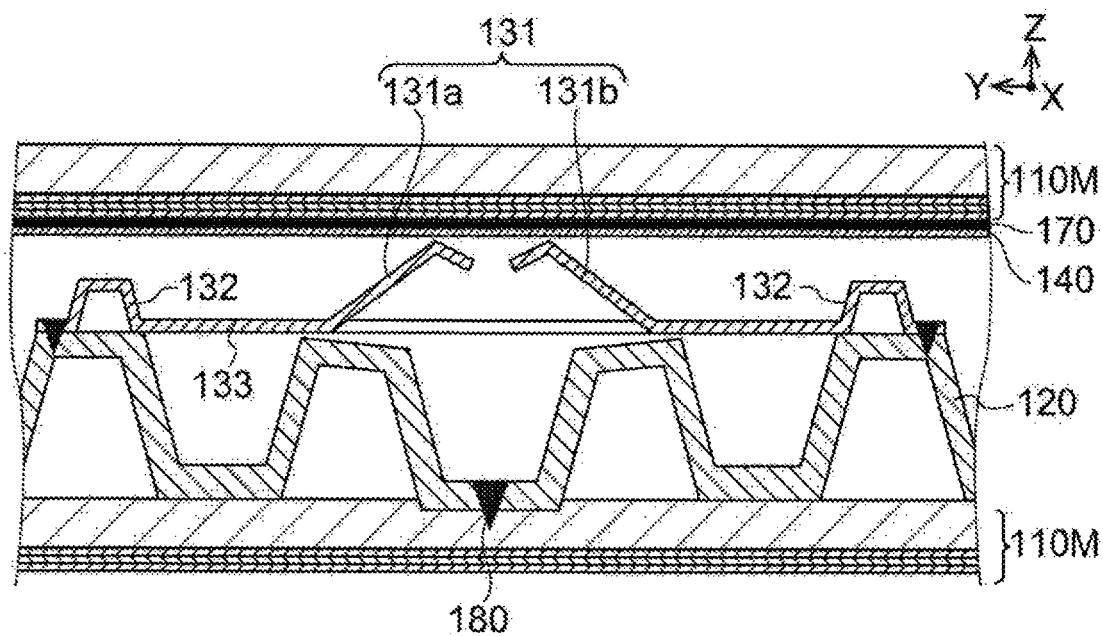
FIG. 10 is a cross-sectional view of a fuel cell stack according to Modified Example 2 of the first embodiment.

FIG. 10 is a cross-sectional view of a fuel cell stack according to Modified Example 2 of the first embodiment. As illustrated in FIG. 10, the fuel cell stack according to Modified Example 2 of the first embodiment is different from the aforementioned first embodiment in that the base plate 133 of the spring portion 131 and the stopper portions 132 is welded to the separator 120.

As in the aforementioned first embodiment, the base plate 133 is arranged on the separator 120 side of (below) the spring portion 131 and the stopper portions 132. Since the base plate 133 is arranged on the separator 120 side, the base plate 133 and the separator 120 can be easily welded to each other.

The separator 120, the spring portion 131, and the stopper portions 132 are integral with each other by welding the base plate 133 and the separator 120 to each other. Integrating the separator 120, the spring portion 131, and the stopper portions 132 can reduce the number of parts in assembly of the fuel cell stack 10. This can reduce the man-hour and reduce the manufacturing cost. Moreover, it is possible to reduce effects of variation (tolerance) in the height of the separator 120, the spring portion 131, and the stopper portions 132.

Modified Example 3 of First Embodiment

Figure 11A:
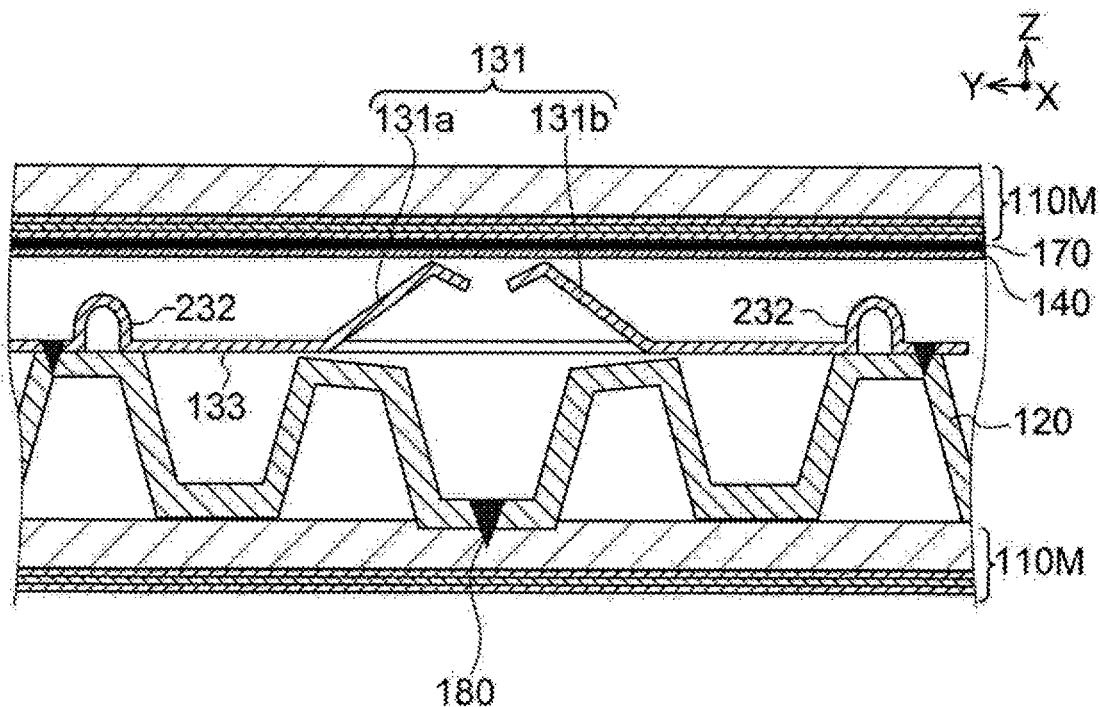
FIG. 11A is a cross-sectional view of a fuel cell stack according to Modified Example 3 of the first embodiment.
Figure 11B:
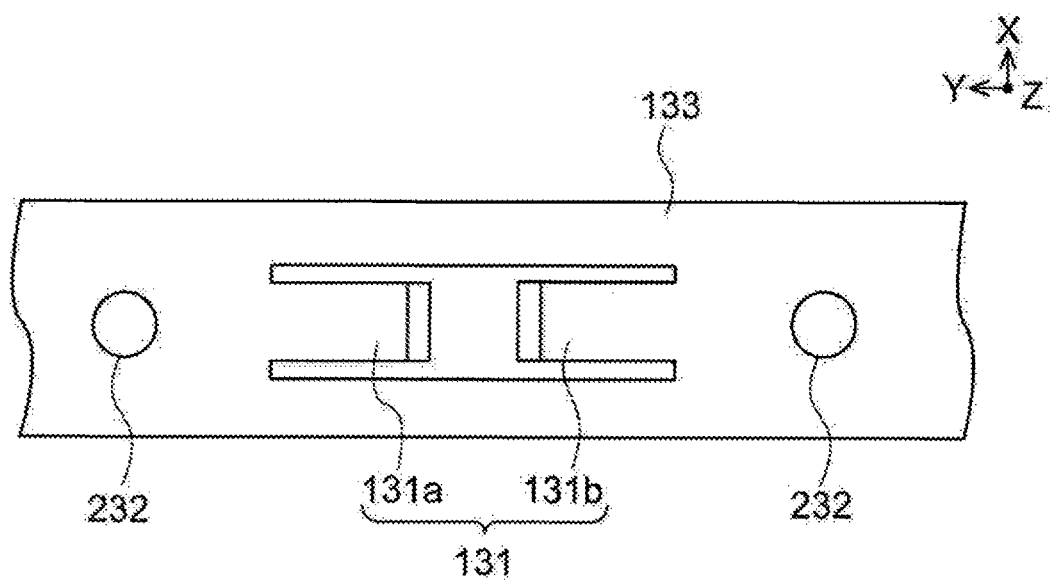
FIG. 11B is a plan view of a spring portion and stopper portions according to Modified Example 3 of the first embodiment.

FIG. 11A is a cross-sectional view of a fuel cell stack according to Modified Example 3 of the first embodiment. FIG. 11B is a plan view of the spring portion 131 and stopper portions 232 according to Modified Example 3 of the first embodiment. As illustrated in FIGS. 11A and 11B, the fuel cell stack according to Modified Example 3 of the first embodiment is different from the aforementioned first embodiment in that the stopper portions 232 are configured of dimples.

The stopper portions 232 are configured of dimples which are multiple substantially-circular recesses formed in the base plate 133. Forming the stopper portions 232 by using dimples can improve the degree of freedom in the arrangement of the stopper portions 232 on the base plate 133. The stopper portions 232 can be thereby arranged at desired positions.

Modified Example 4 of First Embodiment

Figure 12A:
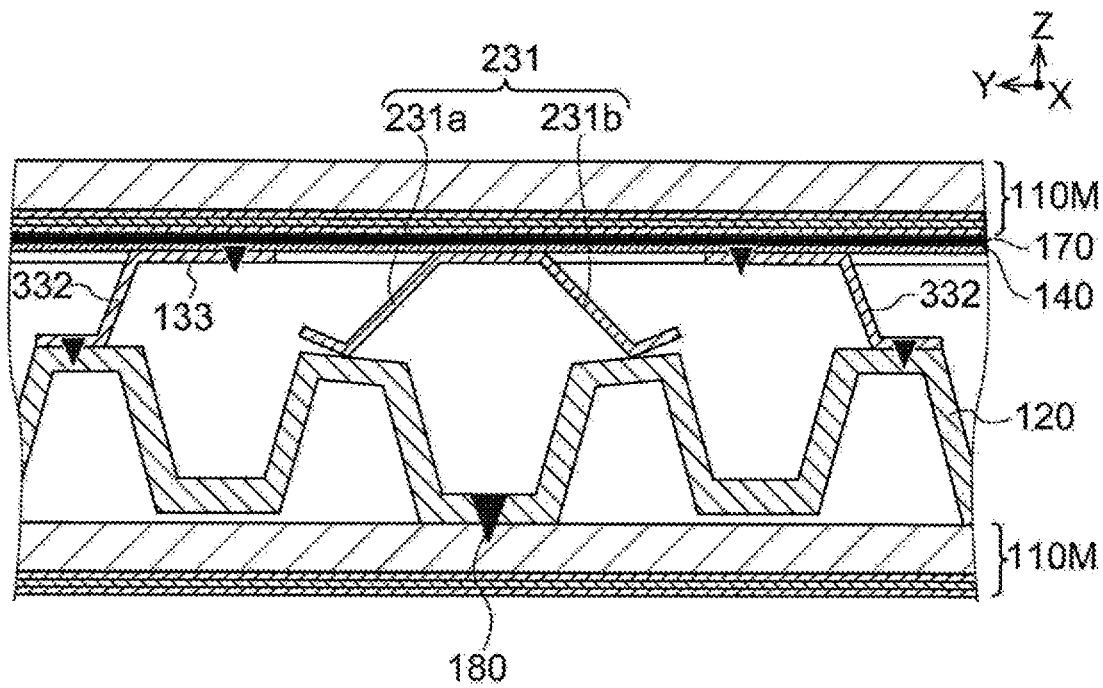
FIG. 12A is a cross-sectional view of a fuel cell stack according to Modified Example 4 of the first embodiment.
Figure 12B:
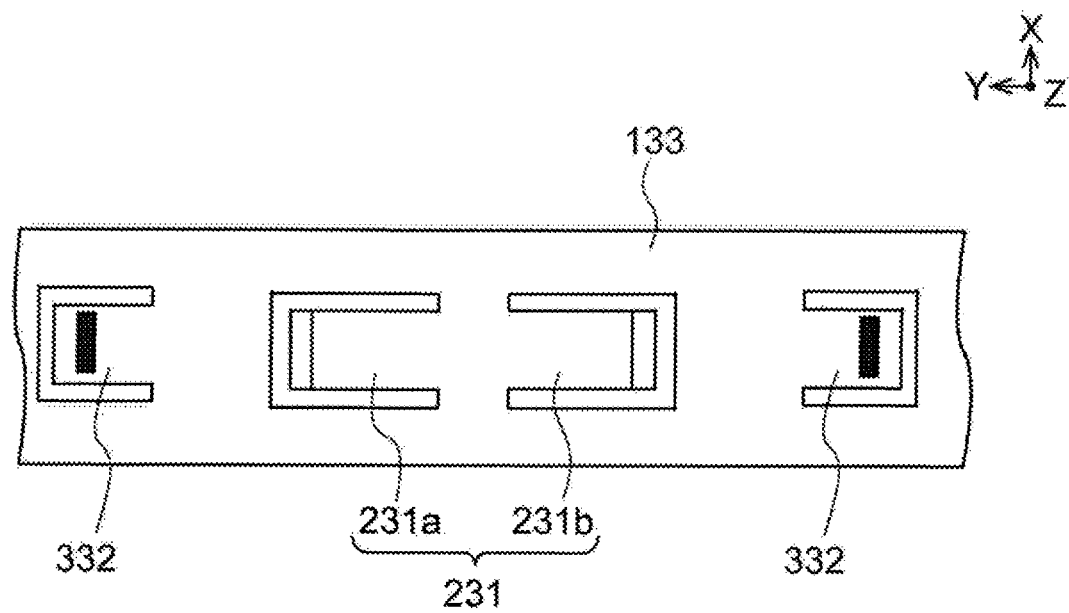
FIG. 12B is a plan view of a spring portion and stopper portions according to Modified Example 4 of the fourth embodiment.

FIG. 12A is a cross-sectional view of a fuel cell stack according to Modified Example 4 of the first embodiment. FIG. 12B is a plan view of the spring portion 231 and stopper portions 332 according to Modified Example 4 of the first embodiment. As illustrated in FIG. 12A, the fuel cell stack according to Modified Example 4 of the first embodiment is different from the aforementioned first embodiment in that the stopper portions 332 are cantilevers.

As in Modified Example 1 of the first embodiment, the spring portion 231 and the stopper portions 332 are arranged on the separator 120 side of (below) the base plate 133. Moreover, the base plate 133 is welded to the current collection assisting layer 140. Furthermore, the first standing piece 231a and the second standing piece 231b of the spring portion 231 are arranged to stand in such directions that the first standing piece 231a and the second standing piece 231b extend away from each other in the long-side direction Y. The same effects as those in Modified Example 1 of the first embodiment can be thereby obtained.

As illustrated in FIGS. 12A and 12B, the stopper portions 332 are cantilevers formed of standing pieces obtained by cutting portions of the base plate 133 and causing them to stand downward. The stopper portions 332 formed as cantilevers can be more easily shaped than the stopper portions supported at both ends. Moreover, lower ends of the stopper portions 332 are welded to the separator 120. Welding the stopper portions 332 to the separator 120 can improve the stiffness of the stopper portions 332. The stopper portions 332 can thereby more surely limit the displacement amount of the spring portion 231.

Modified Example 5 of First Embodiment

Figure 13:
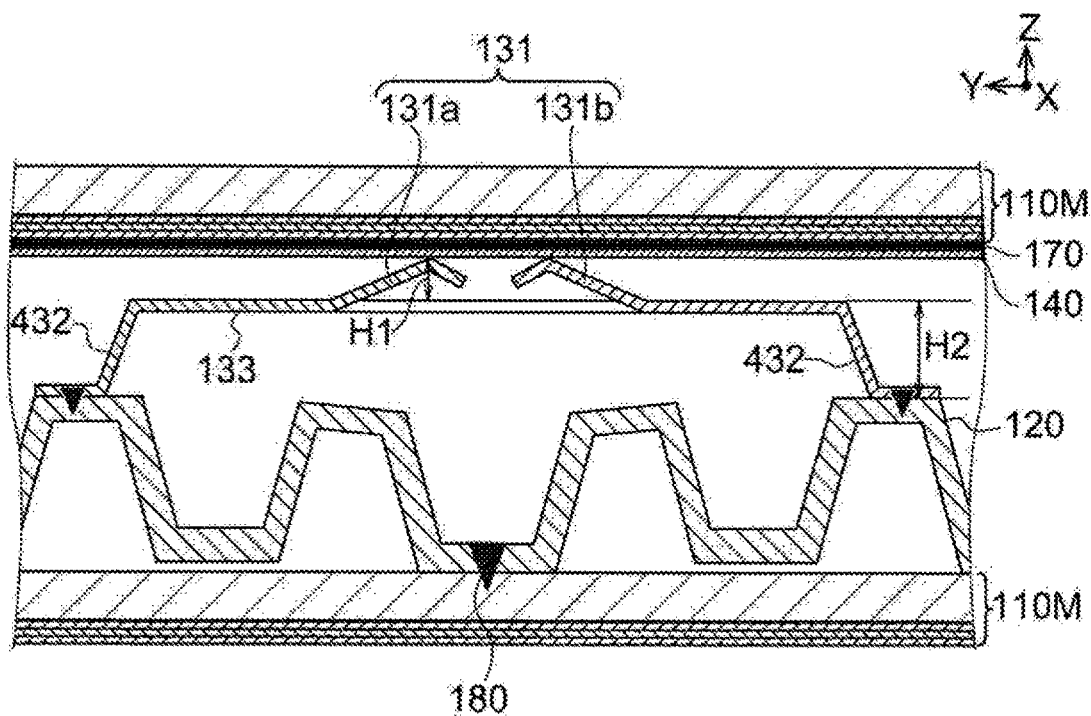
FIG. 13 is a cross-sectional view of a fuel cell stack according to Modified Example 5 of the first embodiment.

FIG. 13 is a cross-sectional view of a fuel cell stack according to Modified Example 5 of the first embodiment. As illustrated in FIG. 13, the fuel cell stack according to Modified Example 5 of the first embodiment is different from the aforementioned first embodiment in that the spring portion 131 and stopper portions 432 are arranged on both sides of the base plate 133 in the up-down direction.

In the aforementioned first embodiment, the spring portion 131 and the stopper portions 132 are arranged on the same side of the base plate 133. In this modified example, the spring portion 131 is arranged above the base plate 133 and the stopper portions 432 are arranged below the base plate 133.

Arranging the spring portion 131 and the stopper portions 432 on the both sides of the base plate 133 in the up-down direction allows the height variation to be absorbed by height equal to the sum of the height H1 of the spring portion 131 and the height H2 of the stopper portions 432. The height variation can be thereby absorbed also when the height variation is large.

Note that the arrangement of the spring portion 131 and the stopper portions 432 is not limited to particular arrangement as long as the spring portion 131 and the stopper portions 432 are arranged on the both sides of the base plate 133. For example, the arrangement may be such that the spring portion 131 is arranged below the base plate 133 and the stopper portions 432 are arranged above the base plate 133.

Modified Example 6 of First Embodiment

Figure 14:
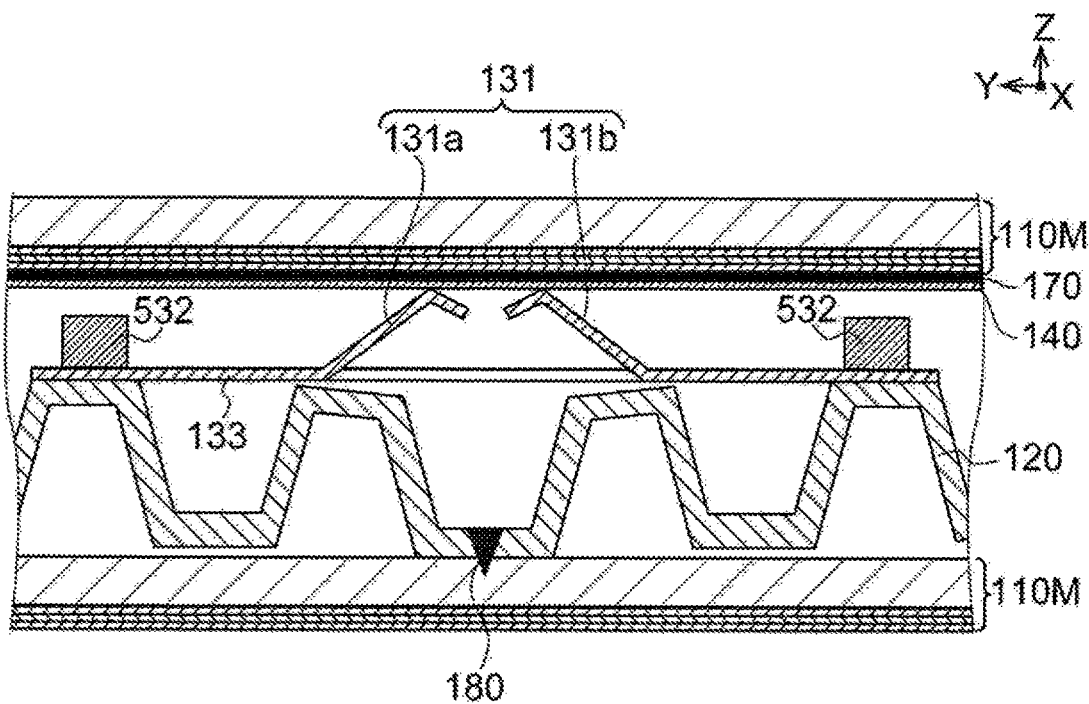
FIG. 14 is a cross-sectional view of a fuel cell stack according to Modified Example 6 of the first embodiment.

FIG. 14 is a cross-sectional view of a fuel cell stack according to Modified Example 6 of the first embodiment. As illustrated in FIG. 14, the fuel cell stack according to Modified Example 6 of the first embodiment is different from the aforementioned first embodiment in that stopper portions 532 are formed of solid ribs.

The stopper portions 532 are formed by arranging rectangular-column-shaped ribs on the base plate 133 such that the ribs extend in the direction of gas flow (short-side direction X) in which the flow passage portion 121 of the separator 120 extends. Forming the stopper portions 532 by using solid ribs can improve the stiffness in the stacking direction from that in the case where the stopper portions have a bridge shape. As a result, the stopper portions 532 can more surely limit the displacement amount of the spring portion 131.

Second Embodiment

Figure 15A:
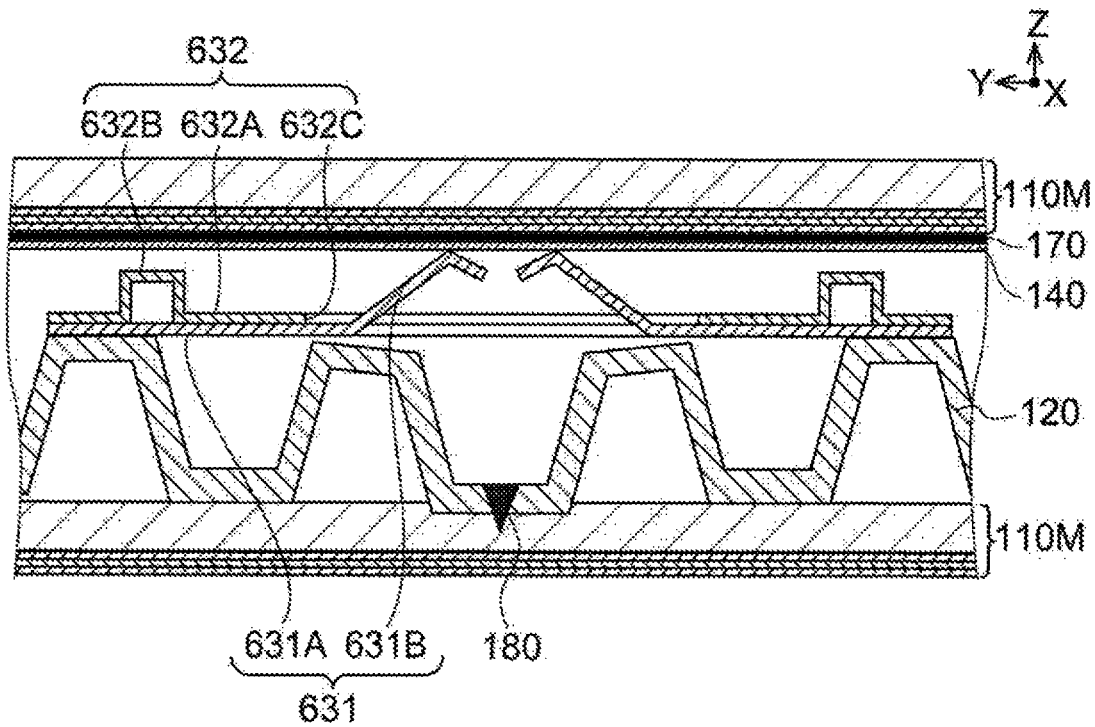
FIG. 15A is a cross-sectional view of a fuel cell stack according to a second embodiment.
Figure 15B:
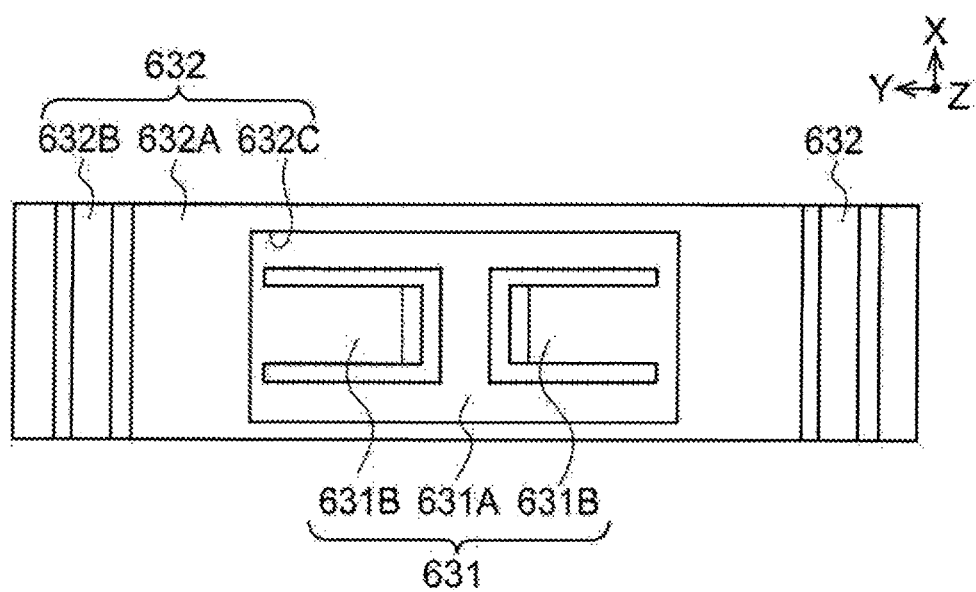
FIG. 15B is a plan view of a spring portion and a stopper portion according to the second embodiment.

FIG. 15A is a cross-sectional view of a fuel cell stack according to a second embodiment. FIG. 15B is a plan view of a spring portion 631 and a stopper portion 632 according to the second embodiment.

As illustrated in FIG. 15A, the fuel cell stack according to the second embodiment is different from the aforementioned first embodiment in that the spring portion 631 and the stopper portion 632 are separate from each other. Note that the same configurations as those in the aforementioned first embodiment are denoted by the same reference numerals and description thereof is omitted.

As illustrated in FIGS. 15A and 15B, the spring portion 631 includes a first base plate 631A and standing pieces 631B formed by cutting portions of the first base plate 631A and causing them to stand upward. The configurations of the standing pieces 631B are the same as those of the first standing piece 131a and the second standing piece 131b in the aforementioned first embodiment. Moreover, the spring portion 631 is arranged closer to the welded portion 180 than the stopper portion 632 is as in the first embodiment.

As illustrated in FIGS. 15A and 15B, the stopper portion 632 includes a second base plate 632A, multiple bridge-shaped protrusion portions 632B which are formed by bending portions of the second base plate 632A such that the portions stand upward, and an opening portion 632C which is formed between the multiple protrusion portions 632B and through which the standing pieces 631B of the spring portion 631 can be inserted upward from below.

As described above, in the fuel cell stack of the second embodiment, the spring portion 631 and the stopper portion 632 are separate from each other. This can improve the degree of freedom in design such as arrangement and materials forming the spring portion 631 and the stopper portion 632.

Modified examples of the second embodiment are described below. Note that the same configurations as those in the aforementioned second embodiment are denoted by the same reference numerals and description thereof is omitted.

Modified Example 1 of Second Embodiment

Figure 16:
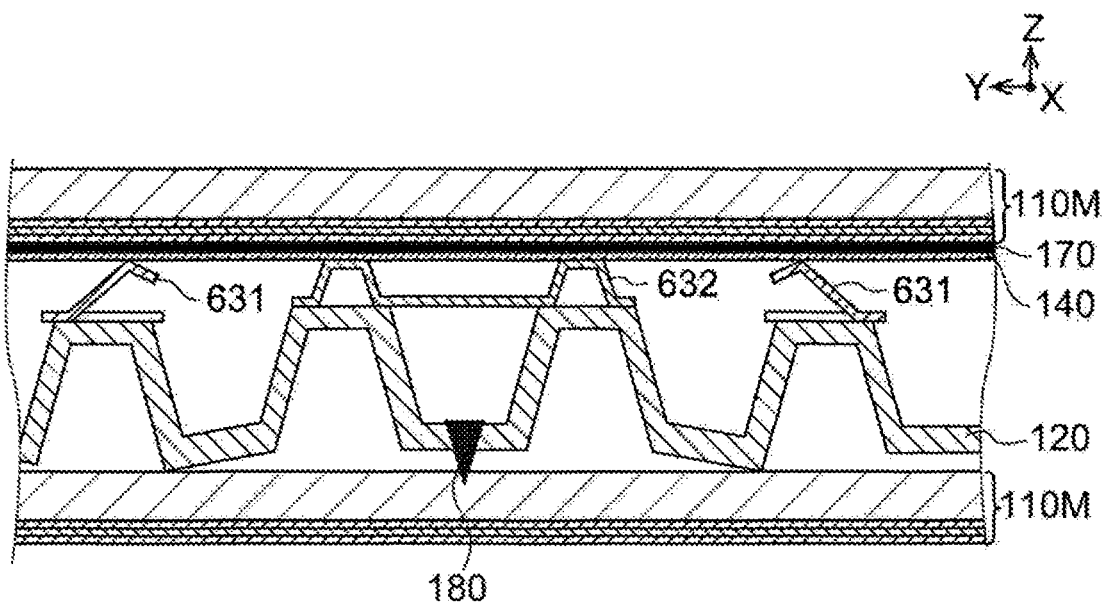
FIG. 16 is a cross-sectional view of a fuel cell stack according to Modified Example 1 of the second embodiment.

FIG. 16 is a cross-sectional view of a fuel cell stack according to Modified Example 1 of the second embodiment. As illustrated in FIG. 16, the fuel cell stack according to Modified Example 1 of the second embodiment is different from the aforementioned second embodiment in that the stopper portion 632 is arranged closer to the welded portion 180 than the spring portion 631 is.

Figure 17:
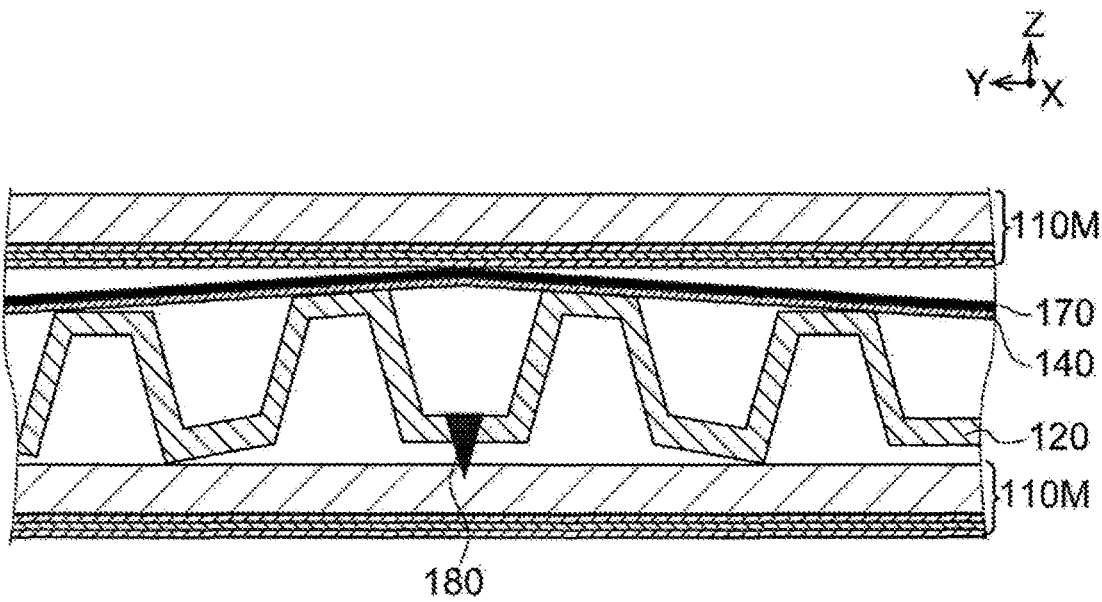
FIG. 17 is a cross-sectional view of a fuel cell stack according to Comparative Example 3.

FIG. 17 is a cross-sectional view of a fuel cell stack according to Comparative Example 3. Although the case where the welded portion 180 of the metal-supported cell 110M and the separator 120 becomes lower than the surrounding portion (see FIG. 6) is given as an example to describe the aforementioned first and second embodiments, there is an opposite case where the welded portion 180 becomes higher than the surrounding portion. For example, as illustrated in FIG. 17, the case where the metal-supported cell 110M and the separator 120 are welded to each other with a gap therebetween and the portion near the welded portion 180 thus becomes higher than the surrounding portion is given as an example to describe this modified example.

As illustrated in FIG. 16, the stopper portion 632 is arranged at a position closer to the welded portion 180 than the spring portion 631 is. The difference in height between the welded portion 180 and a low-height portion surrounding the welded portion 180 can be compensated by arranging the spring portion 631 in the low-height portion. As a result, the height variation in the welded portion 180 can be more surely suppressed. As described above, the arrangement of the spring portion 631 and the stopper portion 132 can be appropriately changed depending on the welding quality of the welded portion 180.

Modified Example 2 of Second Embodiment

Figure 18:
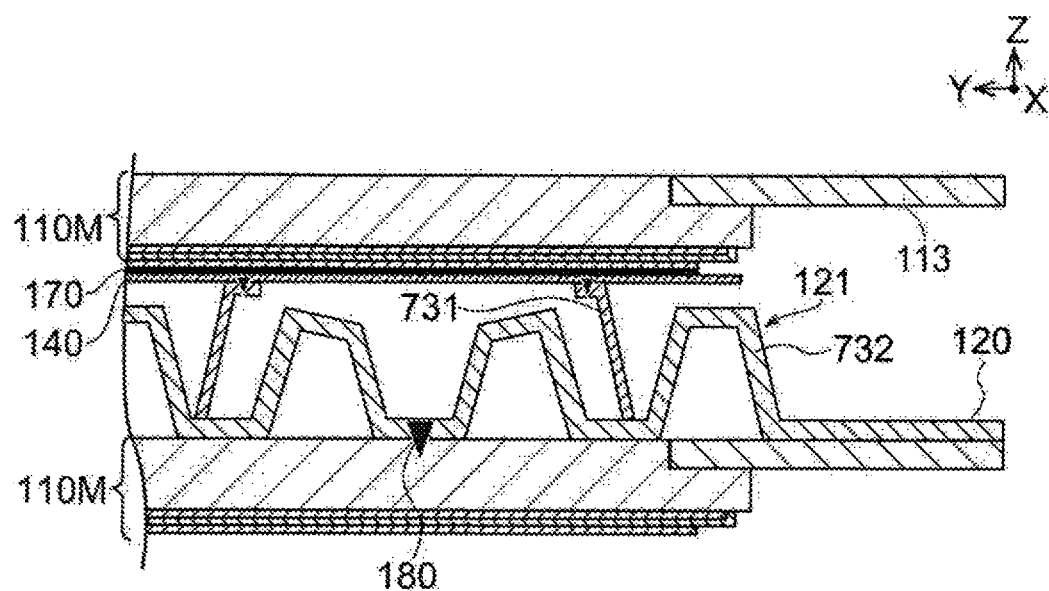
FIG. 18 is a cross-sectional view of a fuel cell stack according to Modified Example 2 of the second embodiment.

FIG. 18 is a cross-sectional view of a fuel cell stack according to Modified Example 2 of the second embodiment. As illustrated in FIG. 18, the fuel cell stack according to Modified Example 2 of the second embodiment is different from the aforementioned second embodiment in that a stopper portion 732 is configured of a portion of the flow passage portion of the separator 120.

Spring portions 731 are configured of cantilevers and one ends thereof are welded to the current collection assisting layer 140. The spring portions 731 are arranged in recess portions of the recess-protrusion-shaped flow passage portion 121 in the separator 120.

The stopper portion 732 is formed of a protrusion portion located in an outermost end portion of the flow passage portion 121 in the separator 120. Using the protrusion portion located in the outermost end portion as the reference of height eliminates the need for providing the stopper portion 732 as a separate member. This can reduce the material cost and the manufacturing cost.

Third Embodiment

Figure 19A:
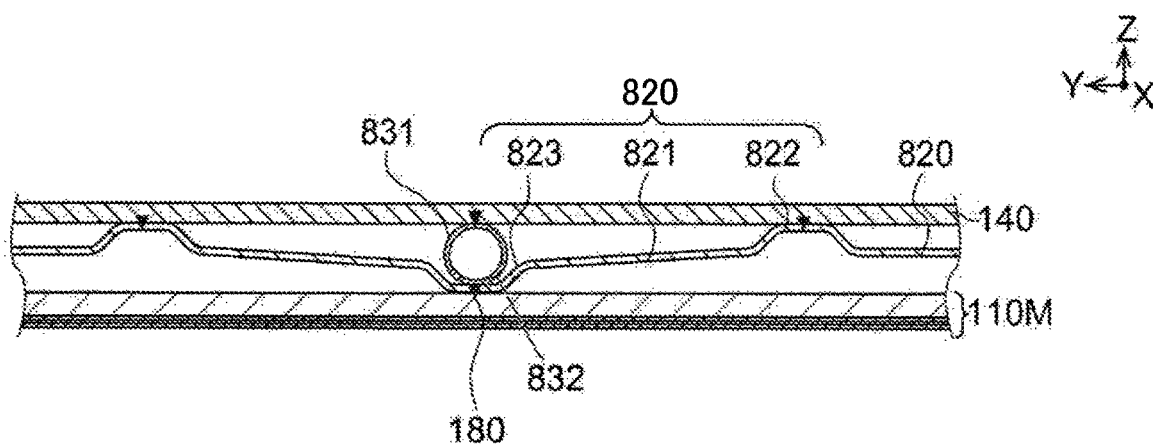
FIG. 19A is a cross-sectional view of a fuel cell stack according to a third embodiment.
Figure 19B:
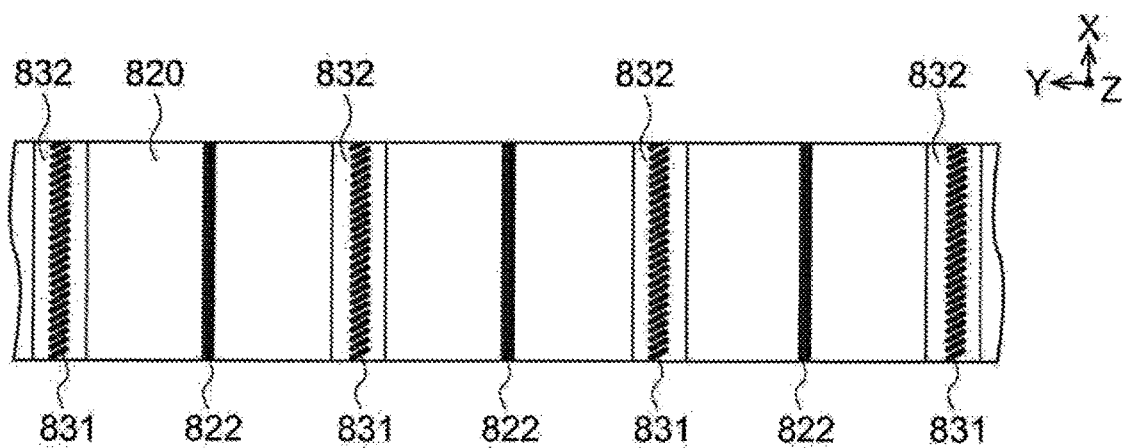
FIG. 19B is a plan view of spring portions and stopper portions according to the third embodiment.
Figure 19C:
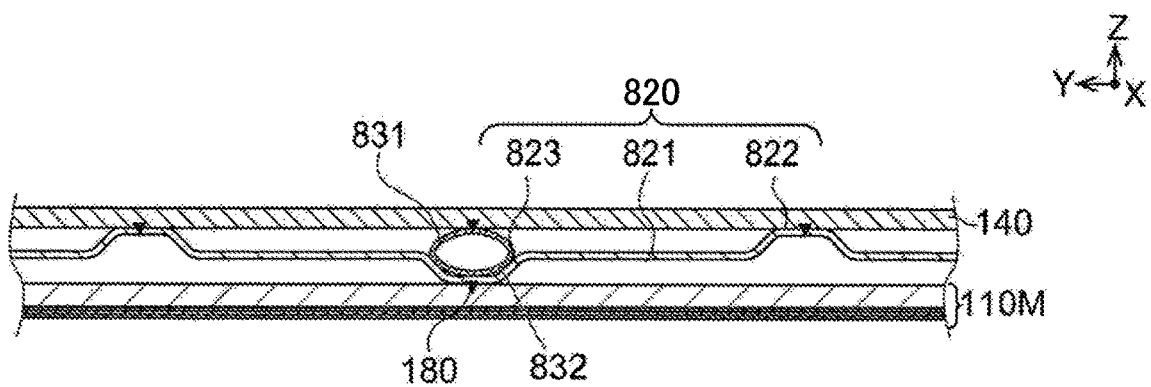
FIG. 19C is a cross-sectional view for explaining operations of the spring portions and the stopper portions according to the third embodiment.

FIG. 19A is a cross-sectional view of a fuel cell stack according to a third embodiment. FIG. 19B is a plan view of spring portions 831 and stopper portions 832 according to the third embodiment. FIG. 19C is a cross-sectional view illustrating a state where the stopper portions 832 limit the displacement (compression) amount of the compressed spring portion 831.

As illustrated in FIGS. 19A and 19B, the fuel cell stack according to the third embodiment is different from the aforementioned first embodiment in that each spring portion 831 is a cylindrical coil spring and each stopper portion 832 is configured of a groove portion 823 of a separator 820. Note that the same configurations as those in the aforementioned first embodiment are denoted by the same reference numerals and description thereof is omitted.

As illustrated in FIG. 19A, a flow passage portion of the separator 820 includes a flat portion 821, multiple protrusion portions 822 protruding upward from the flat portion 821, and multiple groove portions 823 recessed downward from the flat portion 821. The protrusion portions 822 and the groove portions 823 extend in the direction of gas flow (short-side direction X). The protrusion portions 822 of the separator 820 can improve the stiffness of the separator 820 and also increase the cross-sectional area of the flow passage of the anode gas. The welded portion 180 in which the groove portion 823 of the separator 820 and the metal-supported cell 110M are welded to each other is formed therebetween.

As illustrated in FIG. 19B, each spring portion 831 is a cylindrical coil spring extending in the direction of gas flow (short-side direction X). As illustrated in FIG. 19A, the spring portion 831 is arranged above the groove portion 823 where the welded portion 180 is formed. Moreover, the spring portion 831 is welded to the current collection assisting layers 140. Integrating the current collection assisting layers 140 and the spring portion 831 can reduce the number of parts in the assembly of the fuel cell stack. This can reduce the man-hour and reduce the manufacturing cost. Moreover, it is possible to reduce effects of variation (tolerance) in the height of the current collection assisting layer 140 and the spring portion 831.

Each stopper portion 832 is configured of the groove portion 823 of the separator 820. As illustrated in FIG. 19C, when the spring portion 831 is compressed in the stacking direction, the cross-sectional shape of the spring portion 831 changes from a circular shape to an elliptical shape. In this case, a lower portion of the elliptical spring portion 831 comes into contact with the stopper portion 832 configured of the groove portion 823 and the deformation of the spring portion 831 in the stacking direction is limited. In this way, the stopper portion 832 restricts the displacement amount of the spring portion 831.

As described above, the spring portions 831 according to the third embodiment are cylindrical coil springs and the stopper portions 832 are configured of the groove portions 823 of the separator 820. Since the spring portions 831 and the stopper portions 832 can be formed to have relatively-simple configurations as described above, the manufacturing cost can be reduced.

Fourth Embodiment

Figure 20A:
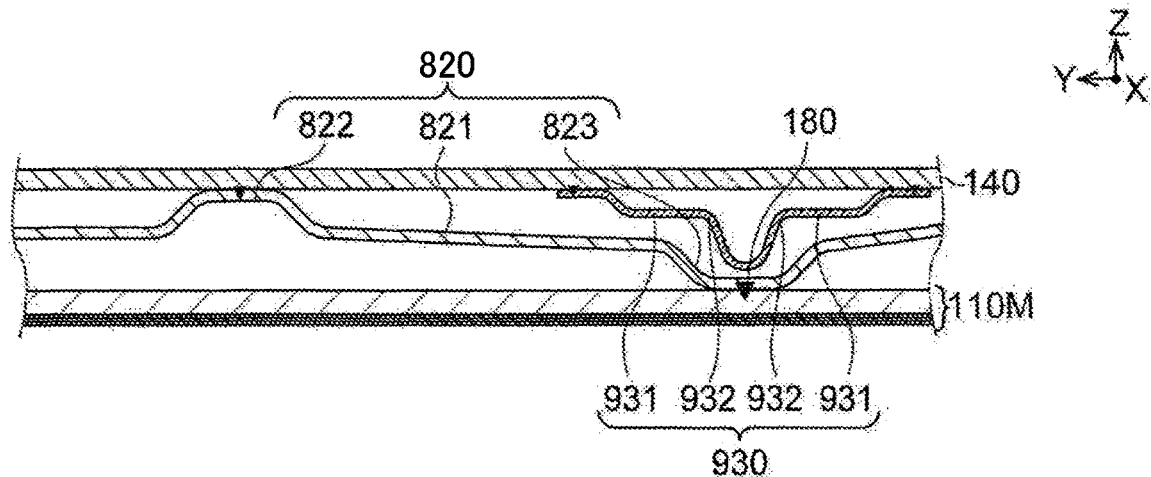
FIG. 20A is a cross-sectional view of a fuel cell stack according to a fourth embodiment.
Figure 20B:
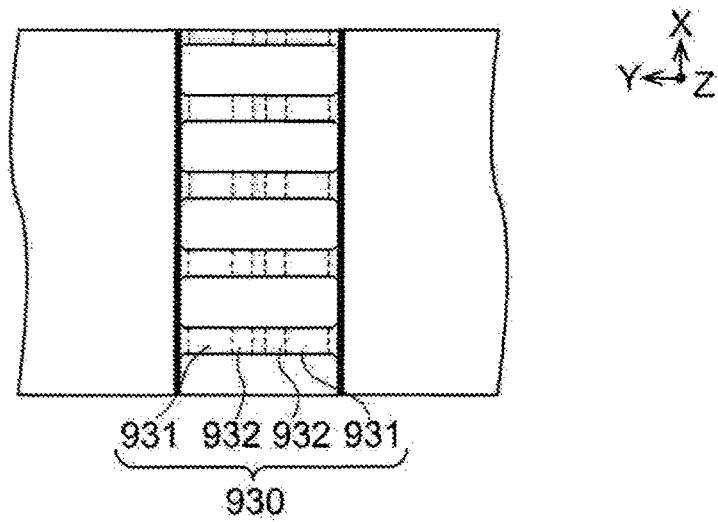
FIG. 20B is a plan view of height adjusters according to the fourth embodiment.

FIG. 20A is a cross-sectional view of a fuel cell stack according to a fourth embodiment. FIG. 20B is a plan view of height adjusters 930 according to the fourth embodiment.

As illustrated in FIGS. 20A and 20B, the fuel cell stack according to the fourth embodiment is different from the aforementioned third embodiment in that the spring portion and the stopper portion are configured of the height adjuster 930 which is a single part. Note that the same configurations as those in the aforementioned third embodiment are denoted by the same reference numerals and description thereof is omitted.

In this case, "the spring portion and the stopper portion are configured of a single part" means that the spring portion and the stopper portion are formed of one component having both of the function of the spring portion and the function of the stopper portion and widely includes a mode in which the component functions as the spring portion by elastically deforming when the component is compressed in the stacking direction in the stacking and functions as the stopper portion when the component further deforms. Specifically, the entire component (the same portion of the component) exhibits both of the function of the spring portion and the function of the stopper portion. Accordingly, the fourth embodiment is different from the mode of "the spring portion and the stopper portion are integral with each other" in which different portions of the integral part exhibit the function of the spring portion and the function of the stopper portion, respectively, as in the first embodiment.

As in the aforementioned third embodiment, as illustrated in FIG. 20A, the flow passage portion of the separator 820 includes the flat portion 821, the multiple protrusion portions 822 protruding upward from the flat portion 821, and the multiple groove portions 823 recessed downward from the flat portion 821. The protrusion portions 822 and the groove portions 823 extend in the direction of gas flow (short-side direction X). The welded portion 180 in which the separator 820 and the metal-supported cell 110M are welded to each other is formed in the groove portion 823.

As illustrated in FIGS. 20A and 20B, the height adjuster 930 includes flat portions 931 and curved portions 932 formed by curving one ends of the flat portions 931 toward the separator 820. The height adjuster 930 is made of an elastically-deformable material. Moreover, the height adjuster 930 has a both-end support structure in which both ends of the height adjuster 930 are joined to the current collection assisting layer 140.

As illustrated in FIG. 20A, when the height adjuster 930 is further compressed from the state where lower ends of the curved portions 932 are in contact with the groove portion 823 of the separator 820, the curved portions 932 are bent. The height adjuster 930 is thereby compressed in the height direction and reaction force is generated in the stacking direction by the elastic force of the height adjuster 930. The height adjuster 930 functions as the spring portion by using this reaction force as the absorption reaction force for absorbing the height displacement in the stacking direction in the welded portion 180.

Figure 20C:
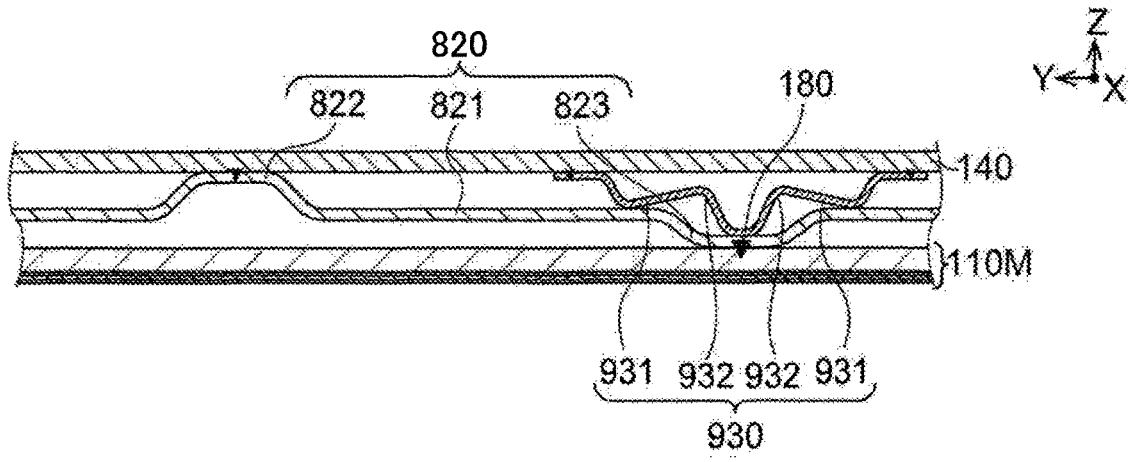
FIG. 20C is a cross-sectional view for explaining an operation of the height adjusters according to the fourth embodiment.

As illustrated in FIG. 20C, when the height adjuster 930 is further compressed in the stacking direction, the flat portions 931 of the height adjuster 930 come into contact with the flat portion 821 of the separator 820. The height adjuster 930 thereby functions as the stopper portion which restricts the displacement amount of the curved portions 932.

As described above, in the fuel cell stack according to the fourth embodiment, since the spring portion and the stopper portion are configured of a single part, it is possible to reduce the number of parts and reduce the manufacturing cost.

Modified Example 1 of Fourth Embodiment

Figure 21A:
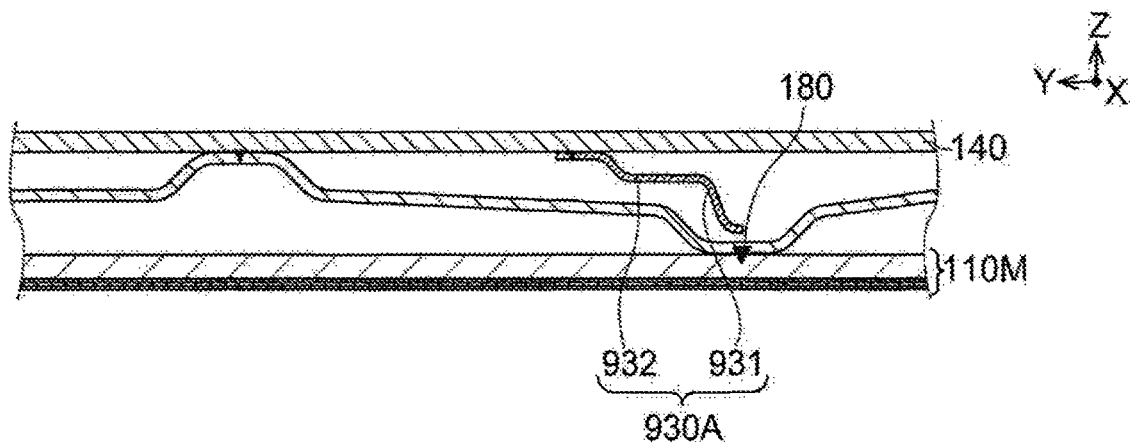
FIG. 21A is a cross-sectional view of a fuel cell stack according to Modified Example 1 of the fourth embodiment.
Figure 21B:
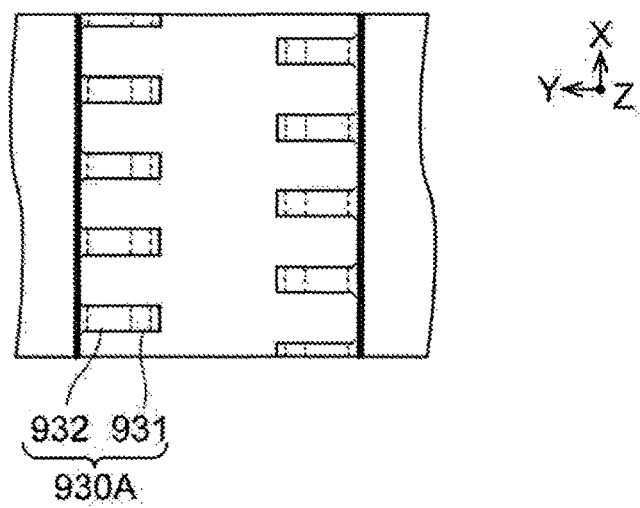
FIG. 21B is a plan view of height adjusters according to Modified Example 1 of the fourth embodiment.

FIG. 21A is a cross-sectional view of a fuel cell stack according to Modified Example 1 of the fourth embodiment. FIG. 21B is a plan view of height adjusters 930A according to Modified Example 1 of the fourth embodiment. The fuel cell stack according to Modified Example 1 of the fourth embodiment is different from the aforementioned fourth embodiment in that the height adjusters 930A are configured of cantilevers.

As illustrated in FIG. 21A, each height adjuster 930A has a cantilever structure in which one end of the height adjuster 930A is joined to the current collection assisting layers 140. As illustrated in FIG. 21B, multiple rows each including multiple height adjusters 930A arranged in the long-side direction Y are arranged in the short-side direction X. The height adjusters 930A in rows adjacent to each other in the short-side direction X are arranged to be shifted from one another in the long-side direction Y to be symmetric with the groove portion 823 of the separator 820 at the center.

Configuring the height adjusters 930A such that they are cantilevers can increase the number of the height adjusters 930A per unit area in the plane direction from that in the case where the height adjusters are supported at both ends. The height adjusters 930A can thereby apply higher absorption reaction force and more surely reduce the contact resistance.

Modified Example 2 of Fourth Embodiment

Figure 22:
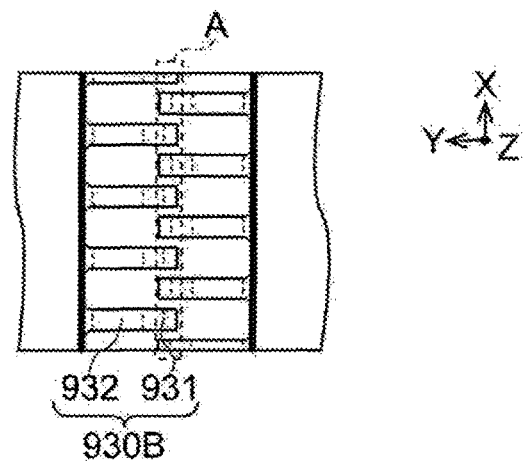
FIG. 22 is a plan view of height adjusters according to Modified Example 2 of the fourth embodiment.

FIG. 22 is a plan view of height adjusters 930B according to Modified Example 2 of the fourth embodiment. The height adjusters 930B according to Modified Example 2 of the fourth embodiment are configured to be cantilevers like the height adjusters 930A according to Modified Example 1 of the fourth embodiment. Multiple rows each including multiple height adjusters 930B arranged in the long-side direction Y are arranged in the short-side direction X. As illustrated in FIG. 22, the height adjusters 930B in rows adjacent to each other in the long-side direction Y are arranged to have an overlapping portion A (portion surrounded by a broken line in FIG. 22) in which the height adjusters 930B overlap one another in the short-side direction X. The height adjusters 930B can thereby apply even higher absorption reaction force in the overlapping portion A and more surely reduce the contact resistance.

Although the fuel cell stack according to the present invention are described above through the embodiments and the modified examples, the present invention is not limited only to the contents described in the embodiments and can be appropriately changed based on the description of the claims. For example, the fuel cell stack may be configured by appropriately combining the specifications of the aforementioned embodiments and modified examples.

REFERENCE SIGNS LIST 10 fuel cell stack
100 cell unit
110 metal-supported cell assembly
110M metal-supported cell
111 power generation cell
111A anode
111C cathode
111E electrolyte
112 metal supporting portion
113 cell frame
120, 820 separator
130, 930, 930A, 930B height adjuster
131, 231, 631, 731, 831 spring portion
131a first standing piece (elastic member)
131b second standing piece (elastic member)
132, 232, 332, 432, 532, 632, 732, 832 stopper portion
133 base plate
140 current collection assisting layer
150 manifold portion
160 sealing portion
170 contact member
180 welded portion
H1 height H1 of spring portion
H2 height H2 of stopper portions
X short-side direction (of fuel cell stack)
Y long-side direction (of fuel cell stack)
Z stacking direction (of fuel cell stack)

The invention claimed is:

1. A fuel cell stack comprising:
    a metal-supported cell including
        a power generation cell formed of paired electrodes and an electrolyte sandwiched from both sides between the paired electrodes, and
        a flat metal supporting plate which is made of metal and having a first flat surface on which the power generation cell is laid and supported, and a second flat surface opposite to the first flat surface;
    a separator defining and forming a flow passage portion for gas flow between the separator and the power generation cell;
    a welded portion in which the second flat surface of the flat metal supporting plate and the separator are directly welded to each other;
    a spring portion configured to apply absorption reaction force to the metal-supported cell for absorbing displacement in a stacking direction in the welded portion; and
    a stopper portion configured to restrict a displacement amount of the spring portion.

2. The fuel cell stack according to claim 1, wherein
the spring portion includes elastic members on the same plane, and
the elastic members are arranged on both sides of the welded portion.

3. The fuel cell stack according to claim 1, wherein the spring portion and the stopper portion are integral with each other.

4. The fuel cell stack according to claim 1, wherein the spring portion and the stopper portion are separate from each other.

5. The fuel cell stack according to claim 1, wherein the spring portion and the stopper portion are configured of a single part.

6. The fuel cell stack according to claim 1, wherein height of the spring portion before compression is greater than height of the stopper portion.

* * * * *